(12) United States Patent
Hirata

(10) Patent No.: US 12,372,835 B2
(45) Date of Patent: Jul. 29, 2025

(54) LIQUID CRYSTAL DISPLAY APPARATUS

(71) Applicant: SAKAI DISPLAY PRODUCTS CORPORATION, Sakai (JP)

(72) Inventor: Mitsuaki Hirata, Sakai (JP)

(73) Assignee: SAKAI DISPLAY PRODUCTS CORPORATION, Sakai (JP)

( * ) Notice: Subject to any disclaimer, the term of this patent is extended or adjusted under 35 U.S.C. 154(b) by 0 days.

(21) Appl. No.: 18/386,027

(22) Filed: Nov. 1, 2023

(65) Prior Publication Data

US 2024/0201544 A1 Jun. 20, 2024

(30) Foreign Application Priority Data

Dec. 15, 2022 (JP) ................. 2022-200263

(51) Int. Cl.
*G02F 1/1343* (2006.01)
*G02F 1/1337* (2006.01)

(52) U.S. Cl.
CPC .. *G02F 1/134345* (2021.01); *G02F 1/133742* (2021.01); *G02F 1/134309* (2013.01)

(58) Field of Classification Search
CPC ........ G02F 1/134309; G02F 1/134345; G02F 1/133742; G02F 1/133753; G02F 1/133757
See application file for complete search history.

(56) References Cited

U.S. PATENT DOCUMENTS

| | | | |
|---|---|---|---|
| 2009/0284703 A1 | 11/2009 | Shoraku et al. | |
| 2009/0322995 A1* | 12/2009 | Yonemura | G02F 1/134363 |
| | | | 349/123 |
| 2012/0133872 A1* | 5/2012 | Kim | G02F 1/133753 |
| | | | 349/128 |
| 2013/0293815 A1* | 11/2013 | Shibazaki | G02F 1/133707 |
| | | | 349/129 |
| 2013/0329148 A1* | 12/2013 | Kuboki | G02F 1/133753 |
| | | | 349/33 |
| 2016/0054604 A1 | 2/2016 | Hirata | |
| 2020/0379303 A1* | 12/2020 | Hirata | G02F 1/133788 |

FOREIGN PATENT DOCUMENTS

| | | | | |
|---|---|---|---|---|
| WO | 2006/132369 A1 | 12/2006 | | |
| WO | 2012/115033 A1 | 8/2012 | | |
| WO | WO-2014196495 A1 * | 12/2014 | ....... | G02F 1/134363 |
| WO | 2016/027316 A1 | 2/2016 | | |

* cited by examiner

*Primary Examiner* — Dung T Nguyen

(74) *Attorney, Agent, or Firm* — ScienBiziP, P.C.

(57) ABSTRACT

Each pixel in the liquid crystal display apparatus includes first to fourth liquid crystal domains which are arranged in two rows and two columns, and have reference alignment directions of first to fourth directions, respectively. In edges of a pixel electrode, a portion provided close to the first liquid crystal domain and a portion provided close to the third liquid crystal domain include a first edge portion and a third edge portion, respectively, which extend along a pixel transverse direction, and a portion provided close to the second liquid crystal domain and a portion provided close to the fourth liquid crystal domain include a second edge portion and a fourth edge portion, respectively, which extend along a pixel longitudinal direction. The pixel electrode includes first to fourth slits which are formed in regions corresponding to the first to fourth liquid crystal domains, and extend in fifth to eighth directions, respectively.

9 Claims, 25 Drawing Sheets

ACTIVE MATRIX SUBSTRATE SIDE

COUNTER SUBSTRATE SIDE

LIQUID CRYSTAL LAYER

LIQUID CRYSTAL DISPLAY APPARATUS

BACKGROUND

1. Technical Field

This disclosure relates to a liquid crystal display apparatus, and more particularly, to a liquid crystal display apparatus which includes a liquid crystal layer of a vertical alignment type, and in which pre-tilt directions of liquid crystal molecules are defined by alignment films.

2. Description of the Related Art

As a method of improving viewing angle characteristics of a vertical alignment (VA) mode liquid crystal display apparatus, there has been known a multi-domain structure in which a plurality of liquid crystal domains are formed in one pixel. As a system of forming the multi-domain structure, in recent years, there has been proposed a four-domain reverse twisted nematic (4D-RTN) mode.

In the 4D-RTN mode, the multi-domain structure is formed by defining pre-tilt directions of liquid crystal molecules by alignment films. The 4D-RTN mode liquid crystal display apparatus is disclosed in, for example, WO 2006/132369 A1. In the liquid crystal display device as disclosed in WO 2006/132369 A1, the pre-tilt directions are defined by the alignment films so that a four-domain structure is formed. That is, when a voltage is applied to a liquid crystal layer, four liquid crystal domains are formed in one pixel. Such a four-domain structure is sometimes simply referred to as "4D structure."

Further, in the liquid crystal display device of WO 2006/132369 A1, the pre-tilt direction defined by one of a pair of alignment films which are opposed to each other through intermediation of the liquid crystal layer and the pre-tilt direction defined by the other alignment film are different from each other by substantially 90°. Accordingly, at the time of voltage application, the liquid crystal molecules have a twisted alignment. As understood from the content disclosed in WO 2006/132369 A1, in the 4D-RTN mode, typically, four liquid crystal domains are arranged in two rows and two columns in the pixel.

In the 4D-RTN mode liquid crystal display apparatus, as described in WO 2006/132369 A1, in the vicinity of an edge of a pixel electrode, a dark line (region darker than other regions) parallel to the edge is caused, and a dark line is caused also at a boundary between adjacent liquid crystal domains. Those dark lines cause reduction in transmittance (light usage efficiency).

In WO 2016/027316 A1, there is disclosed a configuration in which a plurality of slits are formed in a pixel electrode included in the 4D-RTN mode liquid crystal display apparatus. As illustrated in, for example, FIG. 22 of WO 2016/027316 A1, in a region corresponding to each liquid crystal domain, the slits are formed so as to extend parallel to a tilt direction (reference alignment direction). When such silts are formed, an area of the dark line is reduced, and thus the transmittance is improved.

SUMMARY

As a result of performing a detailed investigation by the inventor of the subject application, as described in detail later, it has been found that there is further room for improvement of the transmittance in the 4D-RTN mode liquid crystal display apparatus in which the slits are formed in the pixel electrode.

At least one embodiment of the present invention has been made in view of the above-mentioned problems, and has an object to improve transmittance in a VA-mode liquid crystal display apparatus in which a multi-domain structure is formed by defining pre-tilt directions by alignment films.

This specification discloses a liquid crystal display apparatus described in the following items.

Item 1

According to at least one embodiment of the present invention, there is provided a liquid crystal display apparatus including: a first substrate and a second substrate which are opposed to each other; a liquid crystal layer of a vertical alignment type, which is provided between the first substrate and the second substrate; and a plurality of pixels arrayed in a matrix pattern including a plurality of rows and a plurality of columns, wherein the first substrate includes: a pixel electrode provided in each of the plurality of pixels; and a first alignment film provided between the pixel electrode and the liquid crystal layer, wherein the second substrate includes: a counter electrode opposed to the pixel electrode; and a second alignment film provided between the counter electrode and the liquid crystal layer, wherein each of the plurality of pixels includes a plurality of liquid crystal domains having reference alignment directions which are defined by the first alignment film and the second alignment film, and are different from each other, wherein the plurality of liquid crystal domains include: a first liquid crystal domain having the reference alignment direction which is a first direction; a second liquid crystal domain having the reference alignment direction which is a second direction; a third liquid crystal domain having the reference alignment direction which is a third direction; and a fourth liquid crystal domain having the reference alignment direction which is a fourth direction, wherein the first direction, the second direction, the third direction, and the fourth direction are four directions in which a difference between any two directions is substantially equal to an integral multiple of 90°, wherein each of the plurality of pixels has a shape in which a longitudinal direction and a transverse direction are defined, wherein the first liquid crystal domain, the second liquid crystal domain, the third liquid crystal domain, and the fourth liquid crystal domain are arranged in two rows and two columns, wherein the first liquid crystal domain and the second liquid crystal domain are adjacent to each other along the transverse direction, wherein the third liquid crystal domain and the fourth liquid crystal domain are adjacent to each other along the transverse direction, wherein a portion provided close to the first liquid crystal domain among a plurality of edges of the pixel electrode includes a first edge portion extending along the transverse direction, and a direction which is orthogonal to the first edge portion and is directed toward an inner side of the pixel electrode forms an angle exceeding 90° with respect to the first direction, wherein a portion provided close to the second liquid crystal domain among the plurality of edges of the pixel electrode includes a second edge portion extending along the longitudinal direction, and a direction which is orthogonal to the second edge portion and is directed toward the inner side of the pixel electrode forms an angle exceeding 90° with respect to the second direction, wherein a portion provided close to the third liquid crystal domain among the plurality of edges of the pixel electrode includes a third edge portion extending along the transverse direction, and a direction which is orthogonal to the third edge portion and is directed toward the inner side of the pixel electrode forms an angle exceeding 90° with respect to the third direction, wherein a portion provided close to the fourth liquid crystal domain among the plurality of edges of the pixel electrode includes a fourth edge portion extending along the longitudinal direction, and a direction which is orthogonal to the fourth edge portion and is directed toward the inner side of the pixel electrode forms an angle exceeding 90° with respect to the fourth direction, wherein the pixel electrode includes: a plurality of first slits which are formed in a region corresponding to the first liquid crystal domain, and extend in a fifth direction; a plurality of second slits which are formed in a region corresponding to the second liquid crystal domain, and extend in a sixth direction; a plurality of third slits which are formed in a region corresponding to the third liquid crystal domain, and extend in a seventh direction; and a plurality of fourth slits which are formed in a region corresponding to the fourth liquid crystal domain, and extend in an eighth direction, wherein an acute angle $\theta_5$ formed by the fifth direction with respect to the longitudinal direction is smaller than an acute angle $\theta_1$ formed by the first direction with respect to the longitudinal direction, wherein an acute angle $\theta_6$ formed by the sixth direction with respect to the longitudinal direction is equal to or smaller than an acute angle $\theta_2$ formed by the second direction with respect to the longitudinal direction, wherein an acute angle $\theta_7$ formed by the seventh direction with respect to the longitudinal direction is smaller than an acute angle $\theta_3$ formed by the third direction with respect to the longitudinal direction, wherein an acute angle $\theta_8$ formed by the eighth direction with respect to the longitudinal direction is equal to or smaller than an acute angle $\theta_4$ formed by the fourth direction with respect to the longitudinal direction, and wherein each of a difference between the acute angle $\theta_5$ and the acute angle $\theta_1$ and a difference between the acute angle $\theta_7$ and the acute angle $\theta_3$ is larger than each of a difference between the acute angle $\theta_6$ and the acute angle $\theta_2$ and a difference between the acute angle $\theta_8$ and the acute angle $\theta_4$.

[Item 2]

In the liquid crystal display apparatus according to Item 1, each of the acute angle $\theta_1$, the acute angle $\theta_2$, the acute angle $\theta_3$, and the acute angle $\theta_4$ is substantially 45°.

[Item 3]

In the liquid crystal display apparatus according to Item 1 or 2, the plurality of first are formed in a substantially entire region corresponding to the first liquid crystal domain, the plurality of second slits are formed in a substantially entire region corresponding to the second liquid crystal domain, the plurality of third slits are formed in a substantially entire region corresponding to the third liquid crystal domain, and the plurality of fourth slits are formed in a substantially entire region corresponding to the fourth liquid crystal domain.

[Item 4]

In the liquid crystal display apparatus according to any one of Items 1 to 3, each of the difference between the acute angle $\theta_5$ and the acute angle $\theta_1$ and the difference between the acute angle $\theta_7$ and the acute angle $\theta_3$ is 7.5° or more and 12.5° or less.

[Item 5]

In the liquid crystal display apparatus according to any one of Items 1 to 4, each of the difference between the acute angle $\theta_6$ and the acute angle $\theta_2$ and the difference between the acute angle $\theta_8$ and the acute angle $\theta_4$ is 0° or more and 5.0° or less.

[Item 6]

In the liquid crystal display apparatus according to any one of Items 1 to 5, the plurality of first slits include two or more first slits each having: a first part extending in the fifth direction; a second part which is positioned between the first part and the second liquid crystal domain, and extends in a ninth direction; and a third part which is positioned on an opposite side of the second part with respect to the first part, and extends in a tenth direction, the plurality of third slits include two or more third slits each having: a fourth part extending in the seventh direction; a fifth part which is positioned between the fourth part and the fourth liquid crystal domain, and extends in an eleventh direction; and a sixth part which is positioned on an opposite side of the fifth part with respect to the fourth part, and extends in a twelfth direction, an acute angle $\theta_9$ formed by the ninth direction with respect to the longitudinal direction is smaller than the acute angle $\theta_5$ formed by the fifth direction with respect to the longitudinal direction, an acute angle $\theta_{10}$ formed by the tenth direction with respect to the longitudinal direction is larger than the acute angle $\theta_5$ formed by the fifth direction with respect to the longitudinal direction, an acute angle $\theta_{11}$ formed by the eleventh direction with respect to the longitudinal direction is smaller than the acute angle $\theta_7$ formed by the seventh direction with respect to the longitudinal direction, and an acute angle $\theta_{12}$ formed by the twelfth direction with respect to the longitudinal direction is larger than the acute angle $\theta_7$ formed by the seventh direction with respect to the longitudinal direction.

[Item 7]

In the liquid crystal display apparatus according to Item 6, when, in the region corresponding to the first liquid crystal domain of the pixel electrode, a region in which the first part is formed, a region in which the second part is formed, and a region in which the third part is formed are defined as a first region, a second region, and a third region, respectively, a ratio La/Sa of a gap La between two first slits adjacent to each other among the plurality of first slits with respect to a width Sa of each of the plurality of first slits is smaller in the second region than in the first region, and is larger in the third region than in the first region, and, when, in the region corresponding to the third liquid crystal domain of the pixel electrode, a region in which the fourth part is formed, a region in which the fifth part is formed, and a region in which the sixth part is formed are defined as a fourth region, a fifth region, and a sixth region, respectively, a ratio Lb/Sb of a gap Lb between two third slits adjacent to each other among the plurality of third slits with respect to a width Sb of each of the plurality of third slits is smaller in the fifth region than in the fourth region, and is larger in the sixth region than in the fourth region.

[Item 8]

In the liquid crystal display apparatus according to any one of Items 1 to 7, the first liquid crystal domain and the fourth liquid crystal domain are adjacent to each other along the longitudinal direction, the second liquid crystal domain and the third liquid crystal domain are adjacent to each other along the longitudinal direction, and the pixel electrode further includes: a first connection slit which is formed in the region corresponding to the first liquid crystal domain, and connects end portions on the second liquid crystal domain side of two or more first slits among the plurality of first slits to each other; and a second connection slit which is formed in the region corresponding to the third liquid crystal domain, and connects end portions on the fourth liquid crystal domain side of two or more third slits among the plurality of third slits to each other.

[Item 9]

In the liquid crystal display apparatus according to Item 8, the pixel electrode further includes: a third connection slit which is formed in the region corresponding to the second liquid crystal domain, and connects end portions on the third liquid crystal domain side of two or more second slits among the plurality of second slits to each other; and a fourth connection slit which is formed in the region corresponding to the fourth liquid crystal domain, and connects end portions on the first liquid crystal domain side of two or more fourth slits among the plurality of fourth slits to each other.

According to the at least one embodiment of the present invention, it is possible to improve the transmittance in the VA-mode liquid crystal display apparatus in which the multi-domain structure is formed by defining the pre-tilt directions by the alignment films.

DETAILED DESCRIPTION

Figure 1:
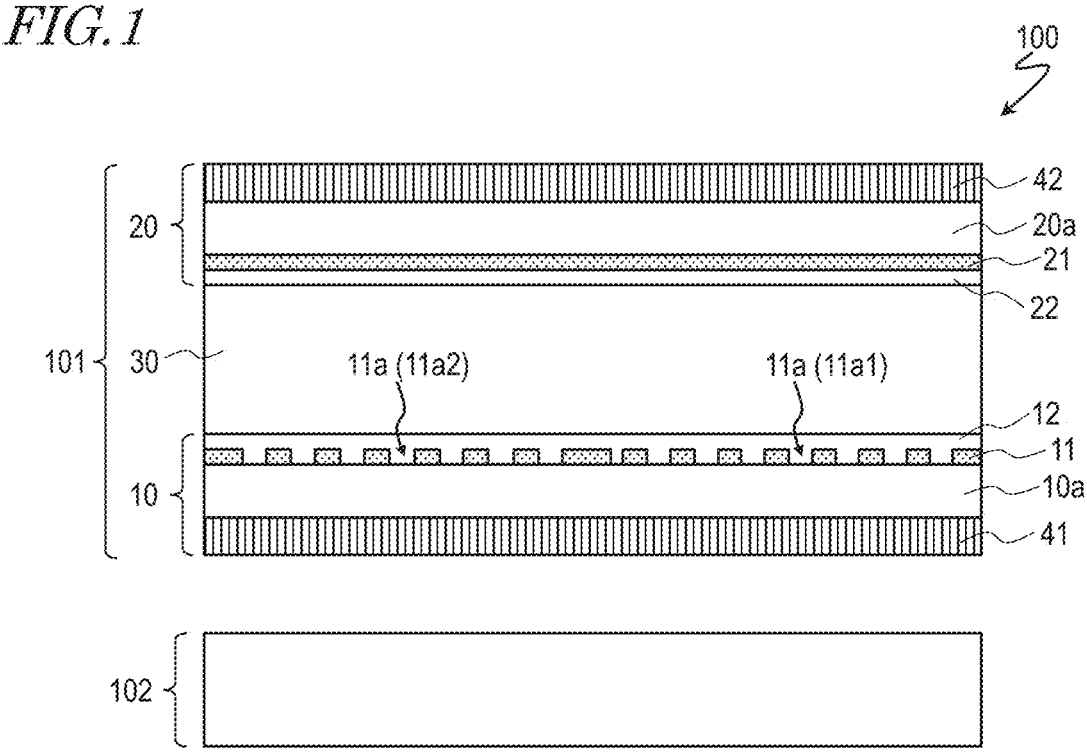
FIG. 1 is a cross-sectional view for schematically illustrating a liquid crystal display apparatus 100 according to an embodiment of the present invention, and shows a cross section taken along the line 1A-1A' of FIG. 2.

First, main terms as used herein are described.

As used herein, a "liquid crystal layer of a vertical alignment type" refers to a liquid crystal layer in which liquid crystal molecules are aligned substantially perpendicular (for example, at an angle of about 85° or more) with respect to a surface of an alignment film (vertical alignment film). The liquid crystal molecules included in the liquid crystal layer of a vertical alignment type have negative dielectric anisotropy. When the liquid crystal layer of a vertical alignment type is combined with a pair of polarizing plates which are arranged in a crossed Nicols state (that is, arranged so that transmission axes of the respective polarizing plates are substantially orthogonal to each other) so as to be opposed to each other through intermediation of the liquid crystal layer, display in a normally black mode is performed.

Further, as used herein, a "pixel" refers to a minimum unit for expressing a particular gradation level in the display, and corresponds to, in color display, a unit for expressing a gradation level of, for example, each of R, G, and B. A combination of an R pixel, a G pixel, and a B pixel forms one color display pixel. Further, herein, a region (pixel region) of a liquid crystal display apparatus corresponding to the "pixel" of display is also referred to as "pixel."

A "pre-tilt direction" is an alignment direction of the liquid crystal molecules defined by the alignment film, and refers to an azimuth angle direction within a display surface. Further, an angle formed by the liquid crystal molecule with respect to the surface of the alignment film at this time is referred to as "pre-tilt angle." It is preferred that an alignment treatment be performed on the alignment film (treatment be performed on the alignment film so as to exert an ability to define the pre-tilt direction being a predetermined direction) through a photo-alignment treatment as described later.

By changing combinations of the pre-tilt directions defined by the pair of alignment films which are opposed to each other through intermediation of the liquid crystal layer, a four-domain structure can be formed. The quadruple pixel (pixel region) includes four liquid crystal domains.

Each of those liquid crystal domains is characterized by the tilt direction (also sometimes referred to as "reference alignment direction") of liquid crystal molecules in the vicinity of a center in in-plane and thickness directions of the liquid crystal layer at the time of application of a voltage to the liquid crystal layer. This tilt direction (reference alignment direction) has a dominant effect on the viewing angle dependence of each domain. When a vector of the tilted liquid crystal molecule from an end portion closer to a substrate on the back surface side toward an end portion farther from this substrate (that is, an end portion closer to a surface on the front surface side) (vector directed from a distal end toward a head portion of a pin illustrated in FIG. 20A or the like referred to later) is considered, the tilt direction is a direction indicated by a component within the substrate surface (projection to the substrate surface) of this vector, and is an azimuth angle direction. The reference of the azimuth angle direction is a horizontal direction of the display surface, and is positive in a counterclockwise direction (when the display surface is assumed as a face of a clock, the direction of 3 o'clock is regarded as an azimuth angle of 0°, and the counterclockwise direction is regarded as positive). When the tilt directions of the four liquid crystal domains are set as four directions in which an angle (difference) formed by any two directions is substantially equal to an integral multiple of 90° (for example, a direction of 10:30, a direction of 7:30, a direction of 4:30, and a direction of 1:30), the viewing angle characteristics are averaged, and thus satisfactory display can be obtained. From the viewpoint of uniformity of the viewing angle characteristics, it is preferred that areas occupied in the pixel region by the four liquid crystal domains be substantially equal to each other.

The liquid crystal layer of a vertical alignment type exemplified in the following embodiments includes liquid crystal molecules having negative dielectric anisotropy (nematic liquid crystal material having negative dielectric anisotropy), and the pre-tilt direction defined by one alignment film and the pre-tilt direction defined by the other alignment film are different from each other by substantially 90°. With those two pre-tilt directions, the tilt direction (reference alignment direction) of the liquid crystal domain is defined. When a voltage is applied to the liquid crystal layer, the liquid crystal molecules in the vicinity of the alignment film have a twisted alignment in accordance with an anchoring force of the alignment film. No chiral agent may be added to the liquid crystal layer, or a chiral agent may be added as required. A VA mode in which the liquid crystal molecules have a twisted alignment through use of a pair of vertical alignment films provided so that their pre-tilt directions (alignment treatment directions) are orthogonal to each other as described above is also referred to as a vertical alignment twisted nematic (VATN) mode. In the VATN mode, it is preferred that the pre-tilt angles defined by the pair of alignment films, respectively, be substantially equal to each other.

As the alignment treatment performed on the alignment film, from the viewpoint of mass production, a photo-alignment treatment is preferred. Further, the photo-alignment treatment can be performed in a non-contact manner, and hence no static electricity is caused by friction unlike a rubbing treatment, and thus reduction in yield can be prevented. Moreover, through use of a photo-alignment film containing a photosensitive group, fluctuations of the pre-tilt angle can be suppressed.

Next, the multi-domain structure in the 4D-RTN mode is described.

Figure 19:
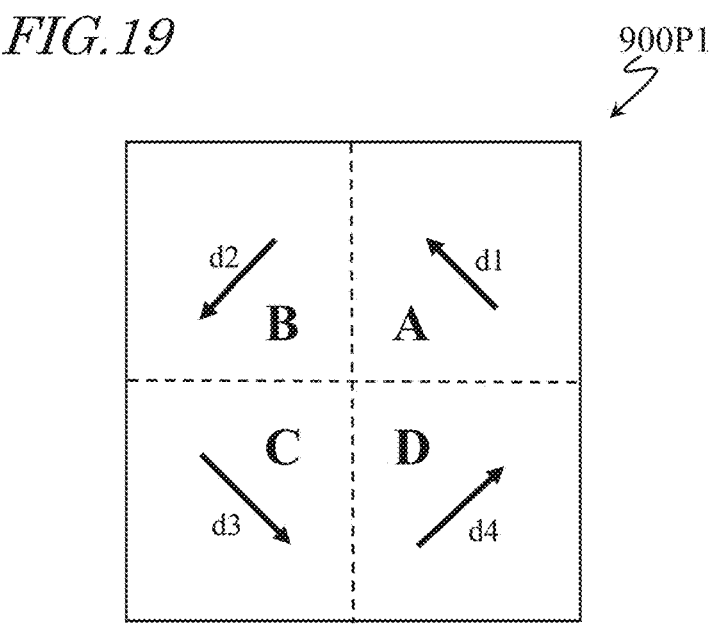
FIG. 19 is a view for illustrating a multi-domain structure of a pixel 900P1 in a general 4D-RTN mode liquid crystal display apparatus.

FIG. 19 shows a multi-domain structure of a pixel 900P1 in a general 4D-RTN mode liquid crystal display apparatus. Under a state in which a voltage is applied to the liquid crystal layer, in the pixel 900P1, as illustrated in FIG. 19, four liquid crystal domains A, B, C, and D are formed. The four liquid crystal domains A, B, C, and D are arranged in a matrix pattern of two rows and two columns.

Azimuths of directors d1, d2, d3, and d4 of the liquid crystal domains A, B, C, and D are four azimuths in which an angle formed by any two azimuths is substantially equal to an integral multiple of 90°. Each of the directors d1, d2, d3, and d4 represents an alignment direction of the liquid crystal molecules included in each liquid crystal domain, and is, in the 4D-RTN mode, a tilt direction of the liquid crystal molecules in the vicinity of a center in in-plane and thickness directions of the liquid crystal layer (that is, positioned in the vicinity of a center when the liquid crystal domain is viewed from each of a direction normal to the display surface and a cross section taken along the direction normal to the display surface) at the time of application of a voltage to the liquid crystal layer. Each liquid crystal domain is characterized by the azimuth (above-mentioned tilt direction) of the director, and this azimuth of the director has a dominant effect on the viewing angle dependence of each domain.

In this case, a pair of polarizing plates which are opposed to each other through intermediation of the liquid crystal layer are arranged so that their transmission axes (polarization axes) are orthogonal to each other. More specifically, the pair of polarizing plates are arranged so that one transmission axis is parallel to the horizontal direction of the display surface (direction of 3 o'clock and direction of 9 o'clock), and the other transmission axis is parallel to a vertical direction of the display surface (direction of 12 o'clock and direction of 6 o'clock).

When the horizontal azimuth angle (direction of 3 o'clock) in the display surface is represented by 0°, the azimuth of the director d1 of the liquid crystal domain A is a direction of substantially 135°, the azimuth of the director d2 of the liquid crystal domain B is a direction of substantially 225°, the azimuth of the director d3 of the liquid crystal domain C is a direction of substantially 315°, and the azimuth of the director d4 of the liquid crystal domain D is a direction of substantially 45°. That is, the liquid crystal domains A, B, C, and D are arranged so that the azimuths of the directors thereof are different by substantially 90° between the liquid crystal domains adjacent to each other in the row direction and between the liquid crystal domains adjacent to each other in the column direction.

Figure 20A:
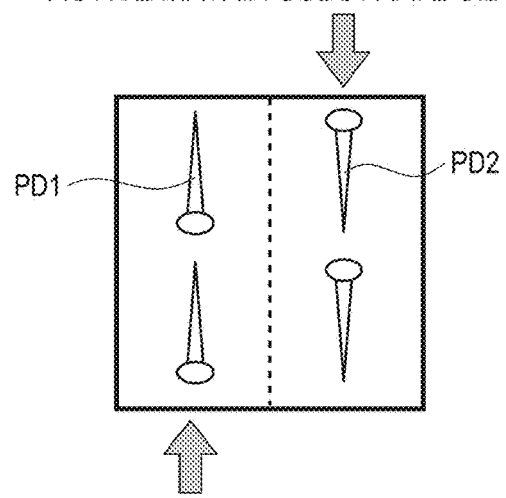
FIG. 20A is an explanatory view for illustrating a method for obtaining the multi-domain structure of the pixel 900P1.
Figure 20B:
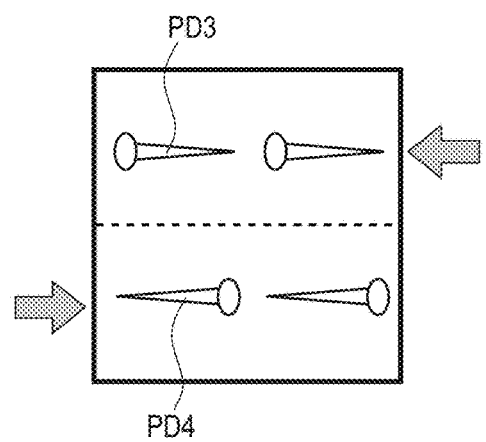
FIG. 20B is an explanatory view for illustrating the method for obtaining the multi-domain structure of the pixel 900P1.
Figure 20C:
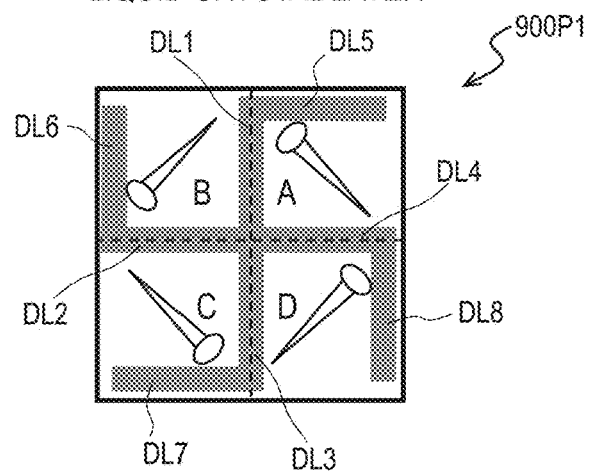
FIG. 20C is an explanatory view for illustrating the method for obtaining the multi-domain structure of the pixel 900P1.

Now, with reference to FIG. 20A, FIG. 20B, and FIG. 20C, an alignment division method for obtaining the multi-domain structure of the pixel 900P1 illustrated in FIG. 19 is described. FIG. 20A shows pre-tilt directions PD1 and PD2 defined by the alignment film provided in an active matrix substrate, and FIG. 20B shows pre-tilt directions PD3 and PD4 defined by the alignment film provided in a counter substrate. Further, FIG. 20C shows tilt directions (directors) at the time of application of a voltage to the liquid crystal layer after the active matrix substrate and the counter substrate are bonded to each other. FIG. 20A, FIG. 20B, and FIG. 20C are views obtained by viewing the active matrix substrate, the counter substrate, and the liquid crystal layer from an observer's side. Accordingly, in FIG. 20A, the alignment film is positioned on the front side of the drawing sheet with respect to the substrate, and, in FIG. 20B, the alignment film is positioned on the depth side of the drawing sheet with respect to the substrate. Further, the pre-tilt direction and the tilt direction are schematically illustrated like a pin. A head portion (end portion having a larger area) of the pin represents an end portion of the liquid crystal molecule on the front surface side (observer's side), and a distal end (end portion having a smaller area) of the pin represents an end portion of the liquid crystal molecule on the back surface side.

A region on the active matrix substrate side (region corresponding to one pixel 900P1) is, as illustrated in FIG. 20A, divided into two right and left regions, and an alignment treatment is performed so that the alignment film (vertical alignment film) in those regions (left region and right region) defines the pre-tilt directions PD1 and PD2 which are antiparallel to each other. In this case, a photo-alignment treatment is performed by obliquely applying ultraviolet rays (for example, linearly polarized ultraviolet rays) from directions indicated by the arrows.

In contrast, a region on the counter substrate side (region corresponding to one pixel 900P1) is, as illustrated in FIG. 20B, divided into two upper and lower regions, and an alignment treatment is performed so that the alignment film (vertical alignment film) in those regions (upper region and lower region) defines the pre-tilt directions PD3 and PD4 which are antiparallel to each other. In this case, a photo-alignment treatment is performed by obliquely applying ultraviolet rays (for example, linearly polarized ultraviolet rays) from directions indicated by the arrows.

When the active matrix substrate and the counter substrate which have been subjected to the alignment treatment as illustrated in FIG. 20A and FIG. 20B are bonded to each other, the pixel 900P1 subjected to alignment division can be formed as illustrated in FIG. 20C. As understood from FIG. 20A, FIG. 20B, and FIG. 20C, in each of the liquid crystal domains A to D, the pre-tilt direction defined by the photo-alignment film of the active matrix substrate and the pre-tilt direction defined by the photo-alignment film of the counter substrate are different from each other by substantially 90°. With those two pre-tilt directions, the tilt direction (azimuth of the director of each liquid crystal domain) is defined. As illustrated, the tilt direction is defined as an intermediate direction of the pins corresponding to two pre-tilt directions.

Further, as illustrated in FIG. 20C, dark lines DL1 to DL8 are caused in the pixel 900P1 having the multi-domain structure. Those dark lines DL1 to DL8 include dark lines DL1 to DL4 caused at boundaries of adjacent liquid crystal domains, and dark lines DL5 to DL8 caused in the vicinity of edges of a pixel electrode. In the example illustrated in FIG. 20C, the dark lines DL1 to DL8 have a right-facing swastika shape as a whole.

Figure 21:
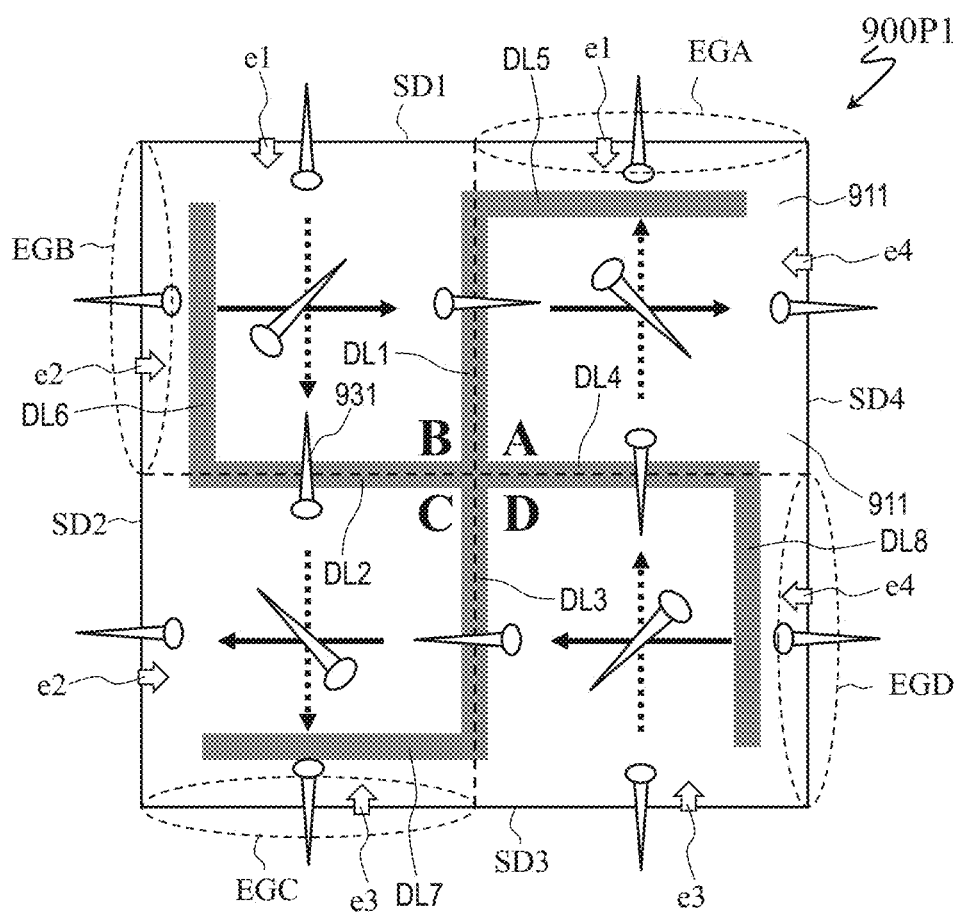
FIG. 21 is a plan view for schematically illustrating an alignment state of liquid crystal molecules 931 in the pixel 900P1.

Now, with reference to FIG. 21, the reason why such dark lines DL1 to DL8 are caused is described. FIG. 21 is a plan view for schematically illustrating an alignment state of liquid crystal molecules 931 in the pixel 900P1.

First, the reason why the dark lines DL1 to DL4 are caused is described.

When a voltage is applied between a pixel electrode 911 and a counter electrode, a vertical electric field is generated in the liquid crystal layer, and the liquid crystal molecules 931 of the liquid crystal layer are aligned in a direction orthogonal to the electric field. That is, the liquid crystal molecules 931 tilt so as to be parallel to the substrate surface. At this time, the azimuth of the director of the liquid crystal molecules 931 in each liquid crystal domain is defined by the pre-tilt direction defined by the alignment film on the active matrix substrate side (indicated by the arrow in the dotted line of FIG. 21) and the pre-tilt direction defined by the alignment film on the counter substrate side (indicated by the arrow in the solid line of FIG. 21). Specifically, the azimuths of the directors of the liquid crystal domains A, B, C, and D are a direction of substantially 135°, a direction of substantially 225°, a direction of substantially 315°, and a direction of substantially 45°, respectively.

In the vicinity of a boundary between adjacent liquid crystal domains, the alignment direction of the liquid crystal molecules 931 continuously changes (due to a property of liquid crystal as a continuous elastic body). Accordingly, for example, at a boundary between the liquid crystal domain A and the liquid crystal domain B, the liquid crystal molecules 931 are aligned in a direction of substantially 180°. Similarly, at a boundary between the liquid crystal domain B and the liquid crystal domain C, a boundary between the liquid crystal domain C and the liquid crystal domain D, and a boundary between the liquid crystal domain D and the liquid crystal domain A, the liquid crystal molecules 931 are aligned in a direction of substantially 270°, a direction of substantially 0°, and a direction of substantially 90°, respectively. The direction of 0°, the direction of 90°, the direction of 180°, and the direction of 270° are directions parallel to or orthogonal to the transmission axis of each of the pair of polarizing plates, and hence the dark lines DL1 to DL4 are caused at the boundaries between the adjacent liquid crystal domains.

Next, the reason why the dark lines DL5 to DL8 are caused is described.

When the edges of the pixel electrode 911 to which the liquid crystal domain is provided close has a portion in which an azimuth angle direction which is orthogonal to this portion and is directed toward the inner side of the pixel electrode 911 forms an angle exceeding 90° with respect to the tilt direction (reference alignment direction) of the liquid crystal domain (hereinafter referred to as "edge portion"), a dark line is formed in parallel to this edge portion on the inner side with respect to this edge portion.

As illustrated in FIG. 21, the pixel electrode 911 has four edges (sides) SD1, SD2, SD3, and SD4. An oblique electric field generated in each of those edges SD1, SD2, SD3, and SD4 at the time of voltage application exerts an alignment regulating force having a component in a direction (azimuth angle direction) orthogonal to each of the edges and directed toward the inner side of the pixel electrode 911. FIG. 21 shows the azimuth angle directions which are orthogonal to the four edges SD1, SD2, SD3, and SD4 and directed toward the inner side of the pixel electrode 911 by arrows e1, e2, e3, and e4, respectively.

Each of the four liquid crystal domains A, B, C, and D is provided close to two of the four edges SD1, SD2, SD3, and SD4 of the pixel electrode 911, and at the time of voltage application, receives an alignment regulating force by an oblique electric field generated in each of the edges.

In an edge portion EGA (right half of the upper edge SD1) in the edges of the pixel electrode 911 to which the liquid crystal domain A is provided close, the azimuth angle direction e1 which is orthogonal to the edge portion EGA and is directed toward the inner side of the pixel electrode 911 forms an angle exceeding 90° (specifically, substantially 135°) with respect to the tilt direction d1 of the liquid crystal domain A. As a result, in the liquid crystal domain A, at the time of voltage application, the dark line DL5 in parallel to this edge portion EGA is caused.

Similarly, in an edge portion EGB (upper half of the left edge SD2) in the edges of the pixel electrode 911 to which the liquid crystal domain B is provided close, the azimuth angle direction e2 which is orthogonal to the edge portion EGB and is directed toward the inner side of the pixel electrode 911 forms an angle exceeding 90° (specifically, substantially 135°) with respect to the tilt direction d2 of the liquid crystal domain B. As a result, in the liquid crystal domain B, at the time of voltage application, the dark line DL6 in parallel to this edge portion EGB is caused.

Similarly, in an edge portion EGG (left half of the lower edge SD3) in the edges of the pixel electrode 911 to which the liquid crystal domain C is provided close, the azimuth angle direction e3 which is orthogonal to the edge portion EGC and is directed toward the inner side of the pixel electrode 911 forms an angle exceeding 90° (specifically, substantially 135°) with respect to the tilt direction d3 of the liquid crystal domain C. As a result, in the liquid crystal domain C, at the time of voltage application, the dark line DL7 in parallel to this edge portion EGC is caused.

Similarly, in an edge portion EGD (lower half of the right edge SD4) in the edges of the pixel electrode 911 to which the liquid crystal domain D is provided close, the azimuth angle direction e4 which is orthogonal to the edge portion EGD and is directed toward the inner side of the pixel electrode 911 forms an angle exceeding 90° (specifically, substantially 135°) with respect to the tilt direction d4 of the liquid crystal domain D. As a result, in the liquid crystal domain D, at the time of voltage application, the dark line DL8 in parallel to this edge portion EGD is caused.

Figure 22:
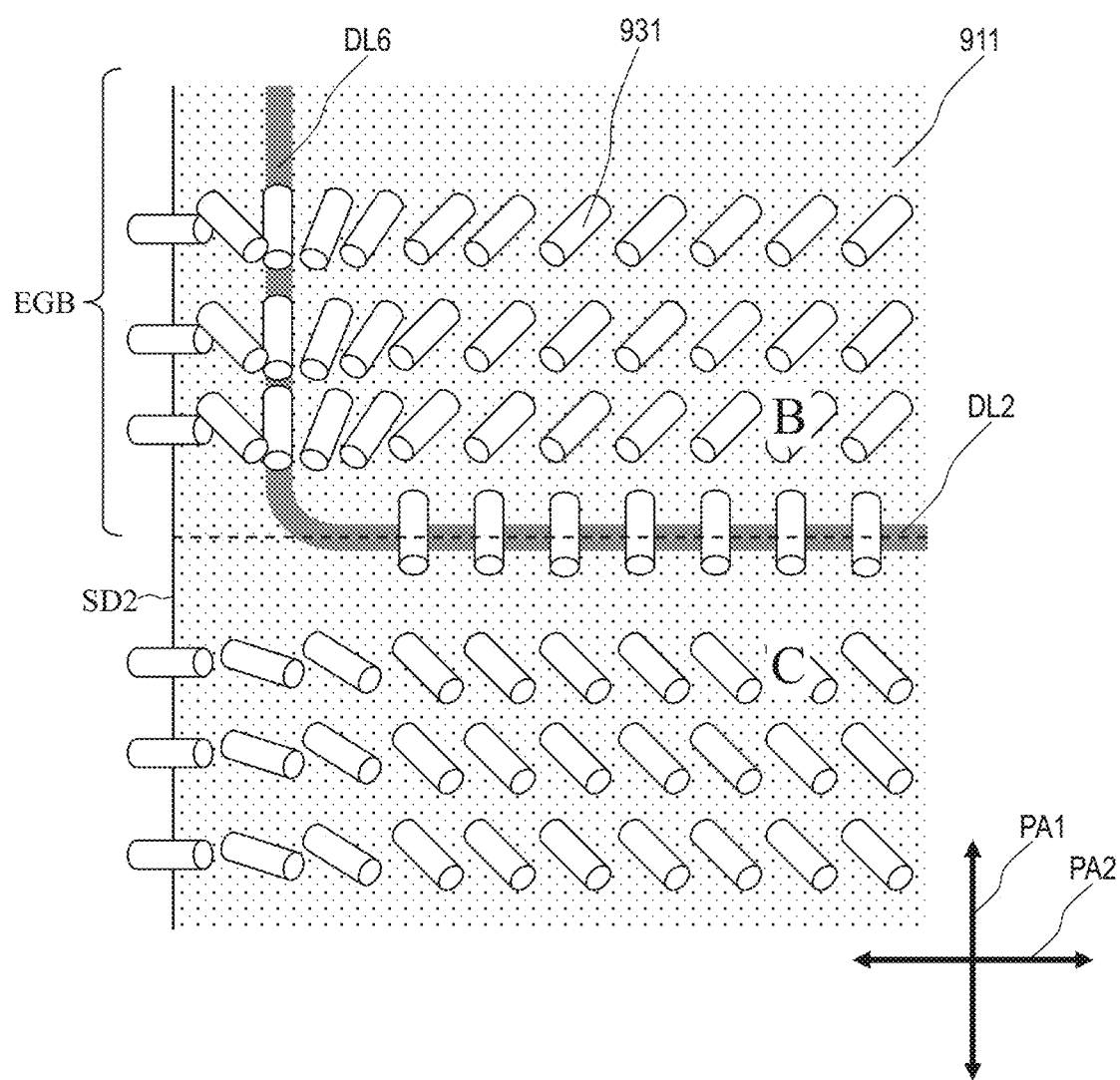
FIG. 22 is a plan view for illustrating an alignment state of the liquid crystal molecules 931 in the vicinity of an edge SD2 of a pixel electrode 911.

FIG. 22 shows an alignment state of the liquid crystal molecules 931 in the vicinity of the edge SD2. As illustrated in FIG. 22, in the vicinity of the edge portion EGB in the edge SD2, the alignment continuously changes from the direction orthogonal to the edge SD2 (direction of substantially 0°) to the tilt direction d2 of the liquid crystal domain B (direction of substantially 225°). As a result, there is a region in which the liquid crystal molecules 931 are aligned in a direction (direction of substantially 270°) substantially parallel or substantially orthogonal to transmission axes PA1 and PA2 of the pair of polarizing plates. This region becomes the dark line DL6.

In contrast, in the vicinity of a portion in the edge SD2 other than the edge portion EGB, the alignment continuously changes from the direction orthogonal to the edge SD2 (direction of substantially 0°) to the tilt direction d3 of the liquid crystal domain C (direction of substantially 315°), but there is no region in which the liquid crystal molecules 931 are aligned in a direction substantially parallel or substantially orthogonal to the transmission axes PA1 and PA2 of the polarizing plates. Thus, no dark line is caused.

Also in the other edges SD1, SD3, and SD4, for similar reasons, the dark lines DL5, DL7, and DL8 are caused in the vicinity of the edge portions EGA, EGC, and EGD, respectively, but no dark line is caused in the vicinity of portions other than the edge portions EGA, EGC, and EGD.

The dark lines caused by the above-mentioned mechanism become a cause of reduction in the transmittance of the pixel. The liquid crystal display apparatus according to at least one embodiment of the present invention has a configuration described below so that an area of the dark line to be caused in the pixel can be reduced, and thus the transmittance can be improved.

Now, description is given of embodiments of the present invention with reference to the drawings. The present invention is not limited to the following embodiments.

First Embodiment

Figure 2:
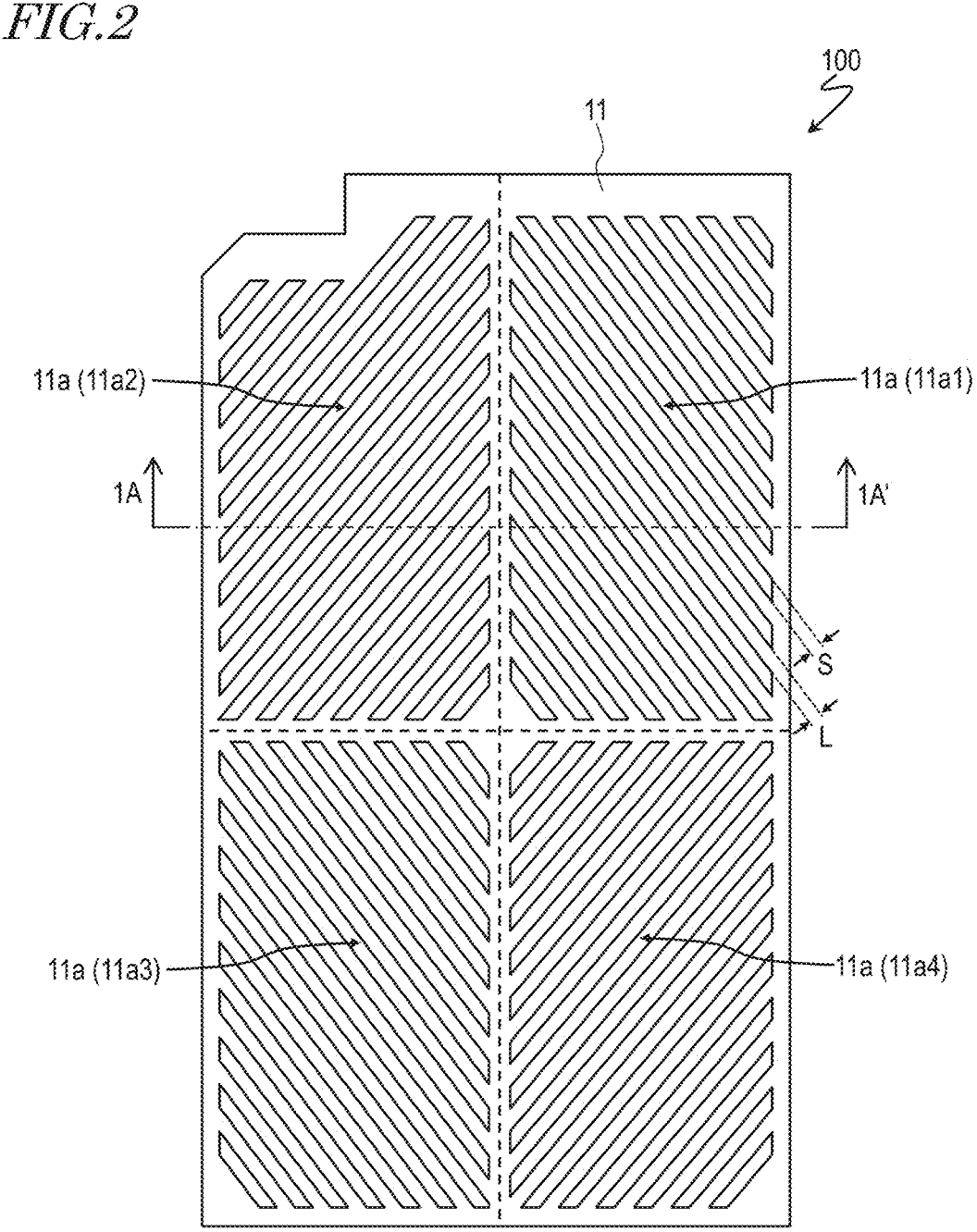
FIG. 2 is a plan view for schematically illustrating the liquid crystal display apparatus 100.

With reference to FIG. 1 and FIG. 2, a liquid crystal display apparatus 100 according to a first embodiment of the present invention is described. FIG. 1 and FIG. 2 are a cross-sectional view and a plan view, respectively, for schematically illustrating the liquid crystal display apparatus 100. FIG. 1 shows a cross section taken along the line 1A-1A' of FIG. 2.

As illustrated in FIG. 1, the liquid crystal display apparatus 100 includes a liquid crystal display panel 101 and a backlight unit (illumination device) 102. The liquid crystal display panel 101 includes an active matrix substrate (first substrate) 10 and a counter substrate (second substrate) 20 which are opposed to each other, and a liquid crystal layer 30 of a vertical alignment type, which is provided between those substrates. The backlight unit 102 is arranged on a back surface side (side opposite to an observer) of the liquid crystal display panel 101. Further, the liquid crystal display apparatus 100 includes a plurality of pixels arrayed in a matrix pattern including a plurality of rows and a plurality of columns.

The active matrix substrate 10 includes a pixel electrode 11 provided in each of the plurality of pixels, and a first alignment film 12 provided between the pixel electrode 11 and the liquid crystal layer 30 (that is, topmost surface of the active matrix substrate 10 on the liquid crystal layer 30 side). The counter substrate 20 includes a counter electrode 21 opposed to the pixel electrode 11, and a second alignment film 22 provided between the counter electrode 21 and the liquid crystal layer 30 (that is, topmost surface of the counter substrate 20 on the liquid crystal layer 30 side). The pixel electrode 11 and the counter electrode 21 are formed of a transparent conductive material (for example, ITO). Each of the first alignment film 12 and the second alignment film 22 has an anchoring force for aligning liquid crystal molecules substantially perpendicular to the surface of the alignment film.

Now, a configuration of each of the active matrix substrate 10 and the counter substrate 20 is described more specifically.

The pixel electrode 11 and the first alignment film 12 of the active matrix substrate 10 are provided in the stated order on a surface of a substrate 10a on the liquid crystal layer 30 side. That is, the pixel electrode 11 and the first alignment film 12 are supported by the substrate 10a. The substrate 10a is transparent and has an insulating property. The substrate 10a is, for example, a glass substrate or a plastic substrate.

In the first embodiment, the pixel electrode 11 has, as illustrated in FIG. 1 and FIG. 2, a plurality of slits 11a. The plurality of slits 11a are formed in substantially the whole of the pixel electrode 11. More specifically, two or more slits 11a are formed in a region corresponding to each of four liquid crystal domains formed through alignment division. In FIG. 2, a boundary between the liquid crystal domains adjacent to each other is indicated by the broken line. A specific configuration of the slits 11a is described in detail later.

Figure 3:
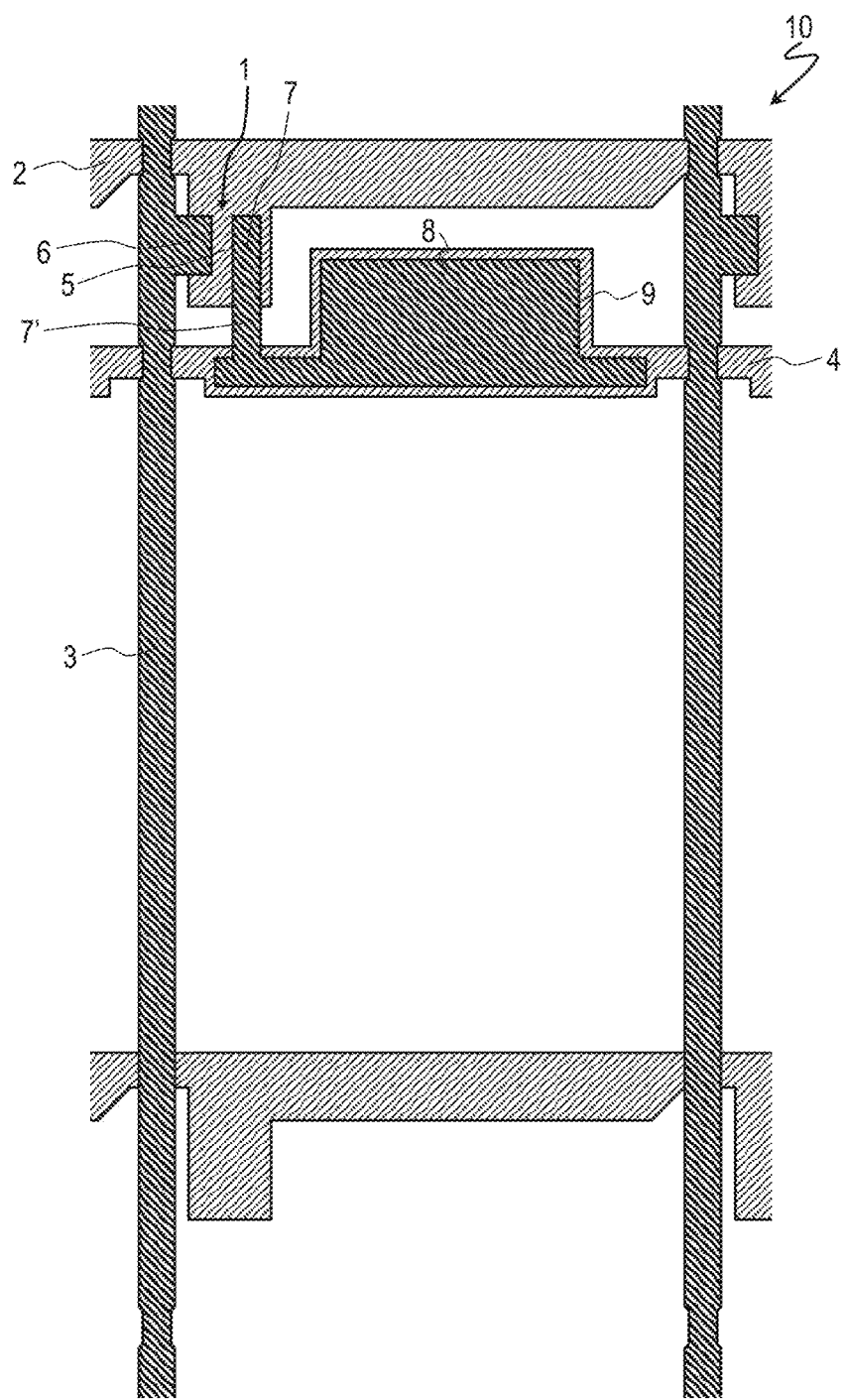
FIG. 3 is a plan view for illustrating an example of a wiring structure of an active matrix substrate 10 included in the liquid crystal display apparatus 100.

The active matrix substrate 10 includes, in addition to the pixel electrode 11 and the first alignment film 12 described above, a thin film transistor (TFT) provided for each pixel, and a scanning wiring line and a signal wiring line for supplying a scanning signal and a display signal, respectively, to the TFT. FIG. 3 shows an example of a wiring structure of the active matrix substrate 10. FIG. 3 shows a wiring structure of a region corresponding to one pixel.

As illustrated in FIG. 3, the active matrix substrate 10 further includes a TFT 1, a scanning wiring line (gate wiring line) 2 extending in the row direction, a signal wiring line (source wiring line) 3 extending in the column direction, and an auxiliary capacitance wiring line 4 extending in the row direction.

The TFT 1 includes a gate electrode 5, a semiconductor layer (not shown), a source electrode 6, and a drain electrode 7. The gate electrode 5 is electrically connected to the gate wiring line 2. In the example illustrated in FIG. 3, the gate electrode 5 and the gate wiring line 2 are integrally formed, and a part of the gate wiring line 2 (part overlapping the semiconductor layer through intermediation of a gate insulating layer (not shown)) functions as the gate electrode 5. The source electrode 6 is electrically connected to the source wiring line 3. In the example illustrated in FIG. 3, the source electrode 6 is provided to extend and branch from the source wiring line 3. The drain electrode 7 is electrically connected to the pixel electrode 11. In the example illustrated in FIG. 3, a connection portion 7' is provided to extend from the drain electrode 7, and the drain electrode 7 and an auxiliary capacitance electrode 8 are connected to each other by the connection portion 7'. The auxiliary capacitance electrode 8 is connected to the pixel electrode 11 through a contact hole formed in an interlayer insulating layer (not shown) formed above the auxiliary capacitance electrode 8. Accordingly, the drain electrode 7 is electrically connected to the pixel electrode 11 via the auxiliary capacitance electrode 8 and the connection portion 7'.

The auxiliary capacitance electrode 8 is opposed to an auxiliary capacitance counter electrode 9 through intermediation of the gate insulating layer. The auxiliary capacitance counter electrode 9 is electrically connected to the auxiliary capacitance wiring line 4. In the example illustrated in FIG. 3, the auxiliary capacitance counter electrode 9 is formed integrally with the auxiliary capacitance wiring line 4. More specifically, the auxiliary capacitance wiring line 4 is formed so that a width of a part thereof is larger than that of other parts, and this part functions as the auxiliary capacitance counter electrode 9. The auxiliary capacitance electrode 8 and the auxiliary capacitance counter electrode 9, and the gate insulating layer positioned between those electrodes form an auxiliary capacitance.

The wiring structure of the active matrix substrate 10 is not limited to that in the example illustrated in FIG. 3.

As illustrated in FIG. 1, the counter electrode 21 and the second alignment film 22 of the counter substrate 20 are provided in the stated order on a surface of a substrate 20a on the liquid crystal layer 30 side. That is, the counter electrode 21 and the second alignment film 22 are supported by the substrate 20a. The substrate 20a is transparent and has an insulating property. The substrate 20a is, for example, a glass substrate or a plastic substrate.

Although not shown here, the counter substrate 20 includes, in addition to the counter electrode 21 and the second alignment film 22 described above, a color filter layer and a light blocking layer (black matrix). The color filter layer typically includes a red color filter, a green color filter, and a blue color filter.

Each of the first alignment film 12 and the second alignment film 22 has an anchoring force for aligning the liquid crystal molecules substantially perpendicular to the surface thereof. In the first embodiment, the first alignment film 12 and the second alignment film 22 are subjected to a photo-alignment treatment. That is, each of the first alignment film 12 and the second alignment film 22 is a photo-alignment film.

The liquid crystal display apparatus 100 further includes a pair of polarizing plates 41 and 42 which are opposed to each other through intermediation of the liquid crystal layer 30. The pair of polarizing plates 41 and 42 are arranged so that transmission axes thereof are substantially orthogonal to each other (that is, in a crossed Nicols state).

Subsequently, with reference to FIG. 4, a multi-domain structure of a pixel P1 in the liquid crystal display apparatus 100 according to the first embodiment is described.

Figure 4:
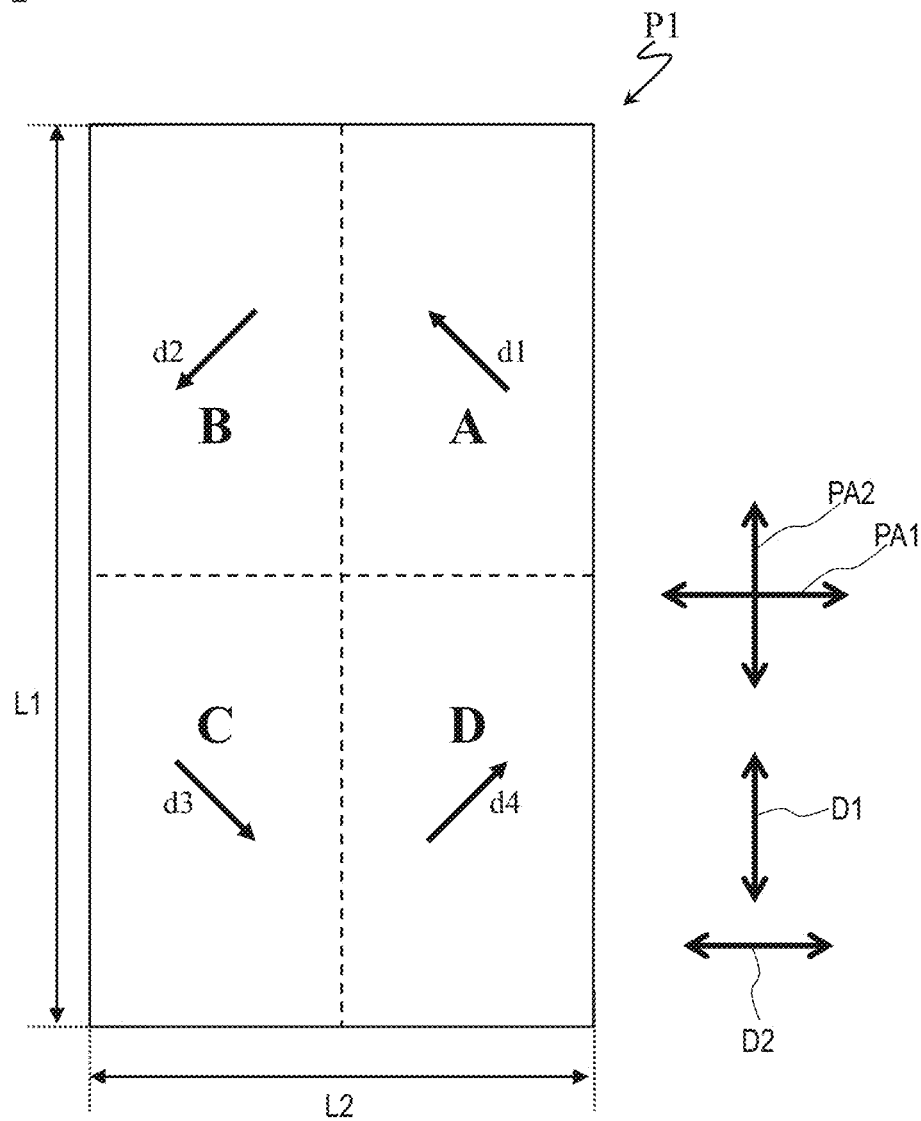
FIG. 4 is a view for illustrating a multi-domain structure of a pixel P1 in the liquid crystal display apparatus 100.

When a voltage is applied between the pixel electrode 11 and the counter electrode 21, in each pixel P1, as illustrated in FIG. 4, four liquid crystal domains A, B, C, and D are formed in the liquid crystal layer 30. In the following, for the sake of convenience, the liquid crystal domains A, B, C, and D are sometimes referred to as "first liquid crystal domain A," "second liquid crystal domain B," "third liquid crystal domain C," and "fourth liquid crystal domain D," respectively. The four liquid crystal domains A, B, C, and D are each adjacent to other liquid crystal domains, and are arranged in a matrix pattern of two rows and two columns. Directors (reference alignment directions) d1, d2, d3, and d4 of the respective liquid crystal domains A, B, C, and D are determined by the pre-tilt directions defined by the first alignment film 12 and the second alignment film 22, and azimuths thereof are different from each other.

When the horizontal azimuth angle (direction of 3 o'clock) in the display surface is represented by 0°, the azimuth of the director d1 of the first liquid crystal domain A is a direction of substantially 135°, the azimuth of the director d2 of the second liquid crystal domain B is a direction of substantially 225°, the azimuth of the director d3 of the third liquid crystal domain C is a direction of substantially 315°, and the azimuth of the director d4 of the fourth liquid crystal domain D is a direction of substantially 45°. That is, a difference between any two azimuths among the azimuths of the four directors of the liquid crystal domains A, B, C, and D is substantially equal to an integral multiple of 90°. Further, the liquid crystal domains A, B, C, and D are arranged so that the azimuths of the directors thereof are different by substantially 90° between the liquid crystal domains adjacent to each other in the row direction and between the liquid crystal domains adjacent to each other in the column direction. Herein, the direction of substantially 45°, the direction of substantially 135°, the direction of substantially 225°, and the direction of substantially 315° mean "direction of from 40° to 50°," direction of from 130° to 140°," direction of from 220° to 230°," and "direction of from 310° to 320°," respectively. As described above, each pixel P1 includes the plurality of liquid crystal domains A, B, C, and D having reference alignment directions which are defined by the first alignment film 12 and the second alignment film 22, and are different from each other.

One of transmission axes (polarization axes) PA1 and PA2 of the pair of polarizing plates 41 and 42 is parallel to a horizontal direction of the display surface, and the other thereof is parallel to a vertical direction of the display surface. Accordingly, each of the transmission axes PA1 and PA2 of the polarizing plates 41 and 42 forms an angle of substantially 45° with respect to each of the azimuths of the directors d1, d2, d3, and d4 of the liquid crystal domains A, B, C, and D.

FIG. 4 exemplifies a case in which areas occupied by the four liquid crystal domains A, B, C, and D in the pixel P1 are equal to each other, but the areas of the four liquid crystal domains A, B, C, and D are not required to be equal to each other. However, from the viewpoint of the uniformity of the viewing angle characteristics, it is preferred that a difference between the areas of the four liquid crystal domains A, B, C, and D be as small as possible. The example illustrated in FIG. 4 is an example of a most preferred (that is, ideal) four-domain structure in terms of the viewing angle characteristics.

Further, in the example illustrated in FIG. 4, each pixel P1 has a substantially rectangular shape in which a longitudinal direction D1 and a transverse direction D2 are defined. In the following, the longitudinal direction D1 and the transverse direction D2 of the pixel P1 are sometimes referred to as "pixel longitudinal direction D1" and "pixel transverse direction D2," respectively. A ratio between a length L1 of the pixel P1 along the pixel longitudinal direction D1 and a length L2 of the pixel P1 along the pixel transverse direction D2 is, for example, 3:1, but the present invention is not limited thereto. In the example illustrated in FIG. 4, the first liquid crystal domain A and the second liquid crystal domain B are adjacent to each other along the pixel transverse direction D2, and the third liquid crystal domain C and the fourth liquid crystal domain D are adjacent to each other along the pixel transverse direction D2. Further, the first liquid crystal domain A and the fourth liquid crystal domain D are adjacent to each other along the pixel longitudinal direction D1, and the second liquid crystal domain B and the third liquid crystal domain C are adjacent to each other along the pixel longitudinal direction D1.

Figure 5A:
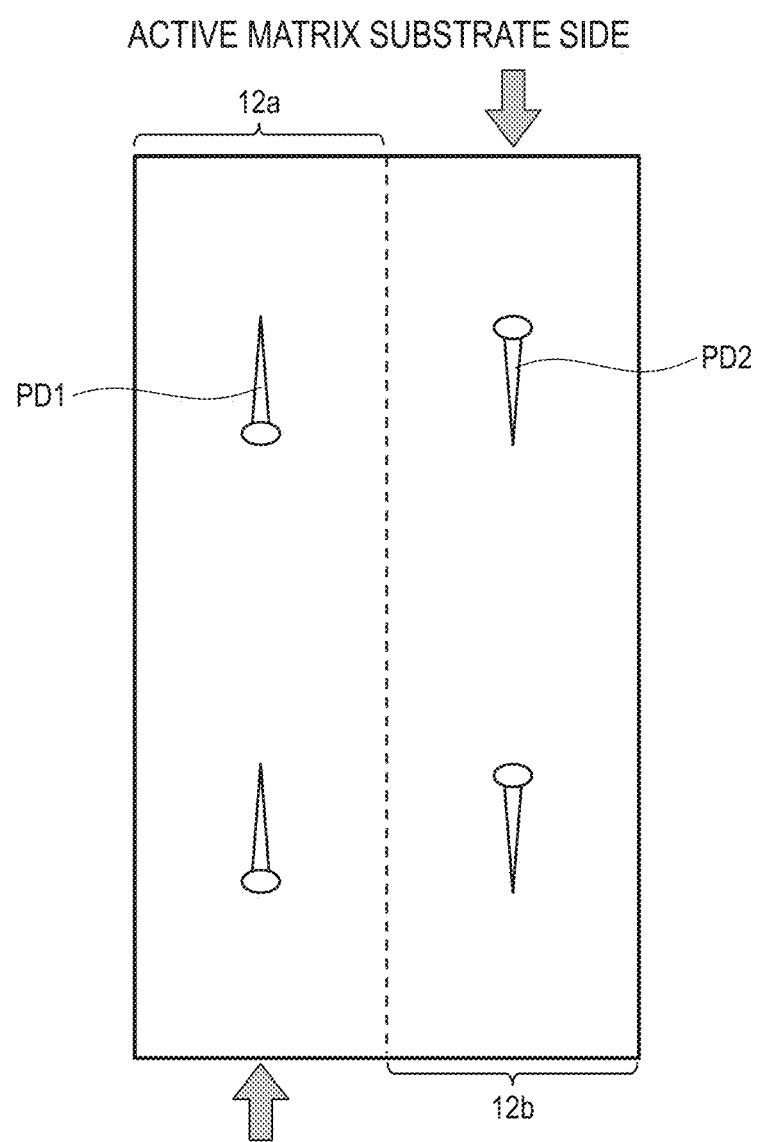
FIG. 5A is an explanatory view for illustrating a method for obtaining the multi-domain structure of the pixel P1.
Figure 5B:
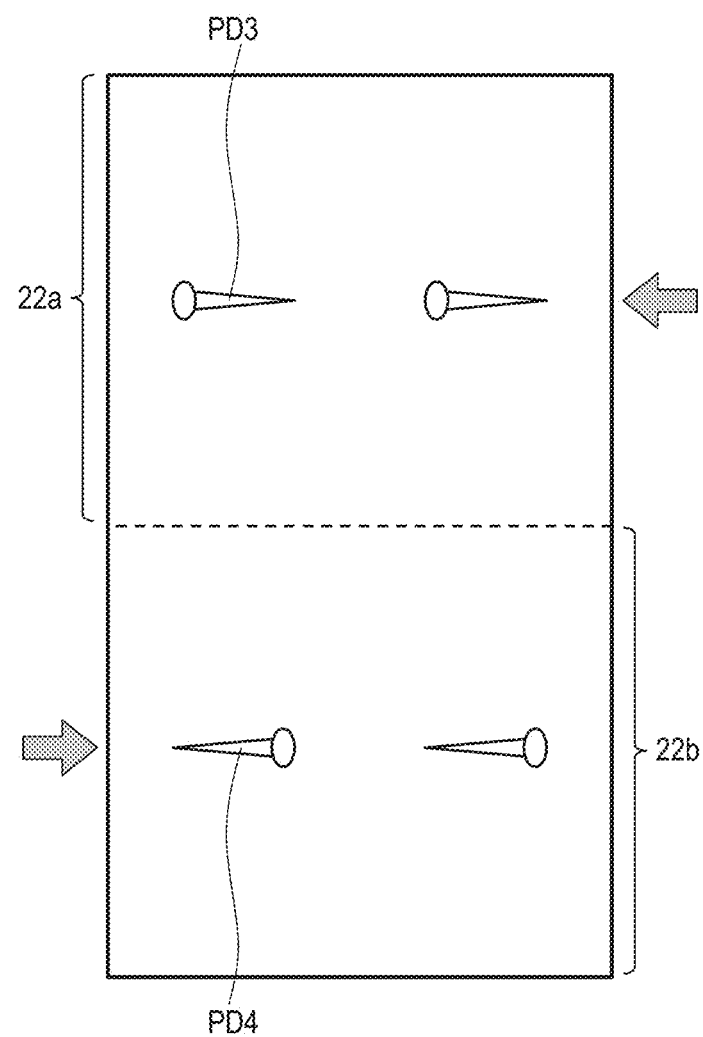
FIG. 5B is an explanatory view for illustrating the method for obtaining the multi-domain structure of the pixel P1.

Subsequently, with reference to FIG. 5A, FIG. 5B, and FIG. 5C, an alignment division method for obtaining the multi-domain structure of the pixel P1 is described. FIG. 5A shows pre-tilt directions PD1 and PD2 defined by the first alignment film 12 provided in the active matrix substrate 10, and FIG. 5B shows pre-tilt directions PD3 and PD4 defined by the second alignment film 22 provided in the counter substrate 20. Further, FIG. 5C shows tilt directions (directors) at the time of application of a voltage to the liquid crystal layer 30 after the active matrix substrate 10 and the counter substrate 20 are bonded to each other.

The first alignment film 12 includes, in each pixel P1, as illustrated in FIG. 5A, a first pre-tilt region 12a for defining the first pre-tilt direction PD1, and a second pre-tilt region 12b for defining the second pre-tilt direction PD2 that is antiparallel to the first pre-tilt direction PD1. Specifically, a region corresponding to one pixel P1 of the first alignment film 12 is divided into two right and left regions, and the photo-alignment treatment is performed so that each of the regions (first pre-tilt region and second pre-tilt region) 12a and 12b define the pre-tilt directions (first pre-tilt direction and second pre-tilt direction) PD1 and PD2 which are antiparallel to each other. In this case, the photo-alignment treatment is performed by obliquely applying ultraviolet rays (for example, linearly polarized ultraviolet rays) from directions indicated by the arrows.

The second alignment film 22 includes, in each pixel P1, as illustrated in FIG. 5B, a third pre-tilt region 22a for defining the third pre-tilt direction PD3 which is substantially orthogonal to the first pre-tilt direction PD1 and the second pre-tilt direction PD2, and a fourth pre-tilt region 22b for defining the fourth pre-tilt direction PD4 that is antiparallel to the third pre-tilt direction PD3. Specifically, a region corresponding to one pixel P1 of the second alignment film 22 is divided into two upper and lower regions, and the photo-alignment treatment is performed so that each of the regions (third pre-tilt region and fourth pre-tilt region) 22a and 22b define the pre-tilt directions (third pre-tilt direction and fourth pre-tilt direction) PD3 and PD4 which are antiparallel to each other. In this case, the photo-alignment treatment is performed by obliquely applying ultraviolet rays (for example, linearly polarized ultraviolet rays) from directions indicated by the arrows.

Figure 5C:
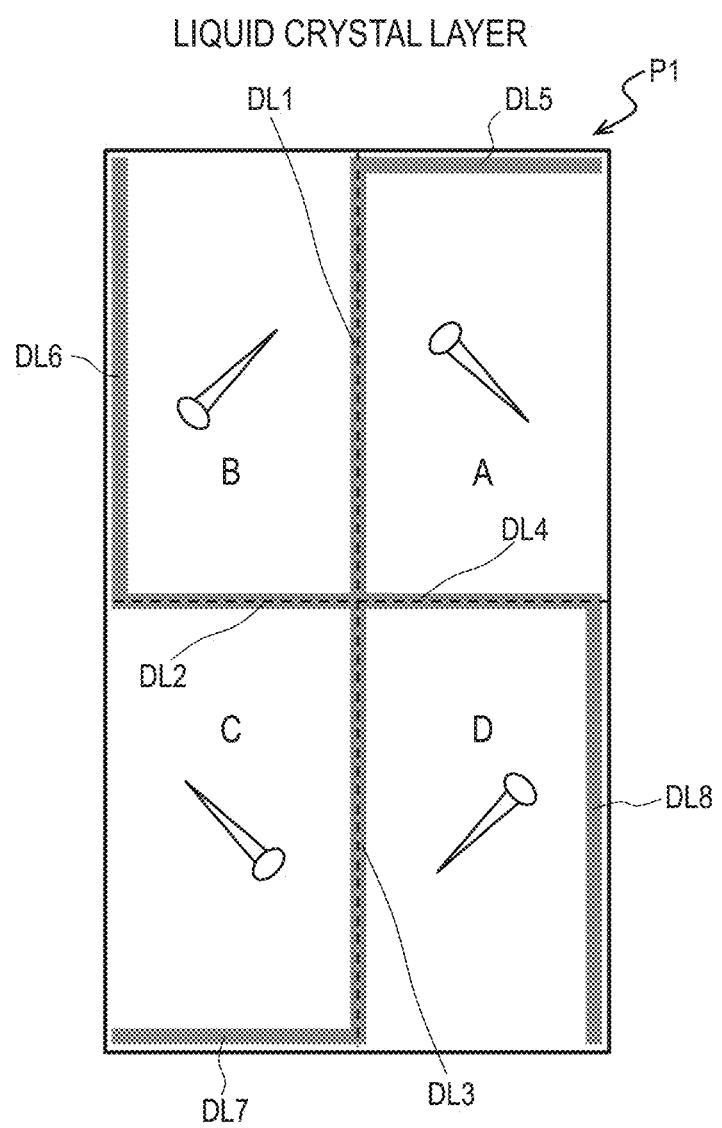
FIG. 5C is an explanatory view for illustrating the method for obtaining the multi-domain structure of the pixel P1.

When the active matrix substrate 10 and the counter substrate 20 which have been subjected to the photo-alignment treatment as illustrated in FIG. 5A and FIG. 5B are bonded to each other, the pixel P1 subjected to alignment division can be formed as illustrated in FIG. 5C. In each of the liquid crystal domains A to D, the pre-tilt direction defined by the first alignment film 12 on the active matrix substrate 10 side and the pre-tilt direction defined by the second alignment film 22 on the counter substrate 20 side are different from each other by substantially 90°. With those two pre-tilt directions, the tilt direction (reference alignment directions) is defined. As understood from FIG. 5C, the tilt direction is defined as an intermediate direction of the pins corresponding to two pre-tilt directions. Further, a boundary between the first pre-tilt region 12a and the second pre-tilt region 12b and a boundary between the third pre-tilt region 22a and the fourth pre-tilt region 22b become boundaries (domain boundaries) between liquid crystal domains adjacent to each other among the four liquid crystal domains A, B, C, and D.

Dark lines DL1 to DL8 are caused in the pixel P1 having the multi-domain structure. Specifically, the dark lines DL1 to DL4 are caused at the boundaries between the adjacent liquid crystal domains, and the dark lines DL5 to DL8 are caused in the vicinity of edges of the pixel electrode 11. The dark lines DL1 to DL8 have a swastika shape (more specifically, a right-facing swastika shape) as a whole. In the liquid crystal display apparatus 100 according to the first embodiment, the total area of the dark lines DL1 to DL8 can be reduced, and thus the transmittance can be improved. Now, the reason therefor is described.

Figure 6:
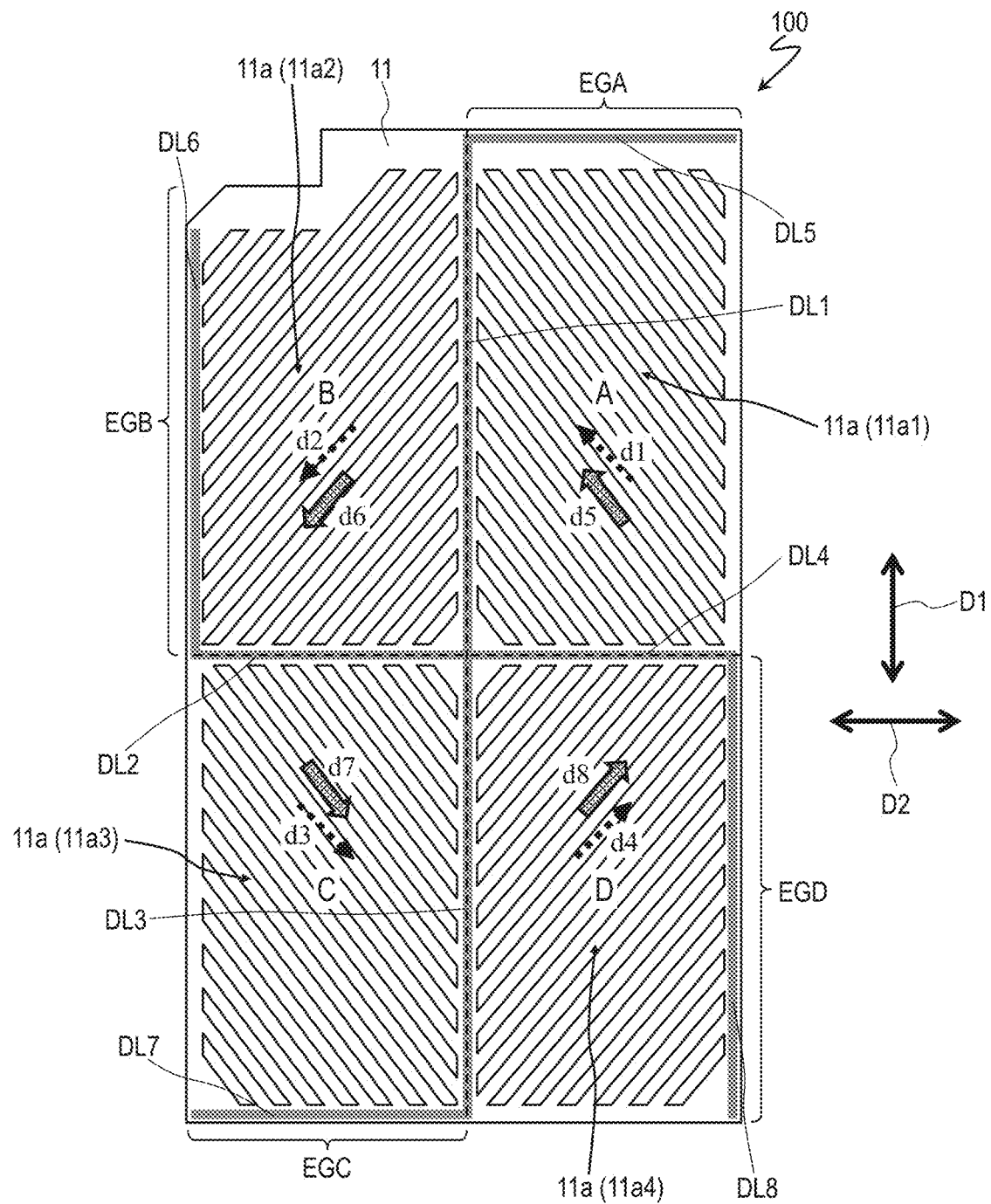
FIG. 6 is a plan view for schematically illustrating the liquid crystal display apparatus 100.

As illustrated in FIG. 6, the pixel electrode 11 includes four edge portions EGA, EGB, EGC, and EGD. In the vicinity of those edge portions EGA, EGB, EGC, and EGD, the dark lines DL5 to DL8 may be caused. Among the four edge portions EGA, EGB, EGC, and EGD, the edge portion EGA provided close to the first liquid crystal domain A and the edge portion EGC provided close to the third liquid crystal domain C each extend along the pixel transverse direction D2 (that is, substantially parallel to the pixel transverse direction D2). Further, the edge portion EGB provided close to the second liquid crystal domain B and the edge portion EGD provided close to the fourth liquid crystal domain D each extend along the pixel longitudinal direction D1 (that is, substantially parallel to the pixel longitudinal direction D1).

As already described, the pixel electrode 11 has the plurality of slits 11a. More specifically, the pixel electrode 11 has a plurality of first slits 11a1, a plurality of second slits 11a2, a plurality of third slits 11a3, and a plurality of fourth slits 11a4. The plurality of first slits 11a1 are formed in a region corresponding to the first liquid crystal domain A, and extend in a direction d5. The plurality of second slits 11a2 are formed in a region corresponding to the second liquid crystal domain B, and extend in a direction d6. The plurality of third slits 11a3 are formed in a region corresponding to the third liquid crystal domain C, and extend in a direction d7. The plurality of fourth slits 11a4 are formed in a region corresponding to the fourth liquid crystal domain D, and extend in a direction d8. In the illustrated example, the plurality of first slits 11a1 are formed in a substantially entire region corresponding to the first liquid crystal domain A, and the plurality of second slits 11a2 are formed in a substantially entire region corresponding to the second liquid crystal domain B. Similarly, the plurality of third slits 11a3 are formed in a substantially entire region corresponding to the third liquid crystal domain C, and the plurality of fourth slits 11a4 are formed in a substantially entire region corresponding to the fourth liquid crystal domain D.

Figure 7:
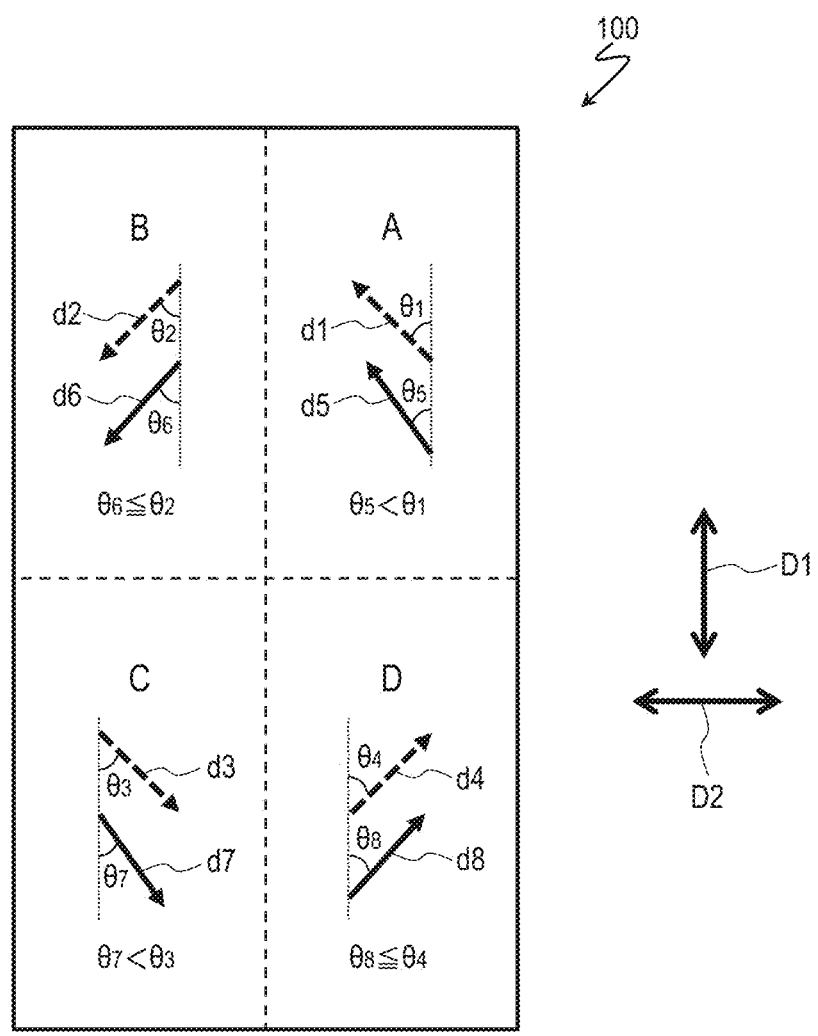
FIG. 7 is an explanatory view for illustrating relationships between directions d5 to d8 in which first to fourth slits 11a1 to 11a4 extend and reference alignment directions d1 to d4 of liquid crystal domains A to D.

The slits 11a of the pixel electrode 11 act so as to increase the number of liquid crystal molecules to be aligned in the direction in which the slits 11a extend (increase the existence probability). Accordingly, for the purpose of reducing the areas of the dark lines DL1 to DL8, it is natural to set the direction in which the slits 11a extend so as to match the reference alignment direction of the corresponding liquid crystal domain. However, the inventor of the subject application has found that, when a direction in which at least a part of slits 11a among the plurality of slits 11a extend is intentionally shifted from the reference alignment direction of the corresponding liquid crystal domain, the transmittance can be more improved. Now, with reference to FIG. 7, relationships between the directions d5, d6, d7, and d8 in which the first slits 11a1, the second slits 11a2, the third slits 11a3, and the fourth slits 11a4 extend and reference alignment directions d1, d2, d3, and d4 of the liquid crystal domains A, B, C, and D in the first embodiment are described. In this case, in order to describe those relationships, attention is paid to an acute angle formed by each of the directions d1 to d8 with respect to the pixel longitudinal direction D1.

An acute angle $\theta_5$ formed by the direction d5 in which the first slits 11a1 extend with respect 1 to the pixel longitudinal direction D1 is smaller than an acute angle $\theta_1$ formed by the reference alignment direction d1 of the first liquid crystal domain A with respect to the pixel longitudinal direction D1 ($\theta_5<\theta_1$). That is, it can be said that the direction d5 is a direction obtained by tilting the reference alignment direction d1 so as to come closer to the pixel longitudinal direction D1.

An acute angle $\theta_6$ formed by the direction d6 in which the second slits 11a2 extend with respect to the pixel longitudinal direction D1 is equal to or smaller than an acute angle $\theta_2$ formed by the reference alignment direction d2 of the second liquid crystal domain B with respect to the pixel longitudinal direction D1 ($\theta_6 \leq \theta_2$). That is, it can be said that the direction d6 is a direction obtained by tilting the reference alignment direction d2 so as to come closer to the pixel longitudinal direction D1 or the same direction as the reference alignment direction d2.

An acute angle $\theta_7$ formed by the direction d7 in which the third slits 11a3 extend with respect to the pixel longitudinal direction D1 is smaller than an acute angle $\theta_3$ formed by the reference alignment direction d3 of the third liquid crystal domain C with respect to the pixel longitudinal direction D1 ($\theta_7<\theta_3$). That is, it can be said that the direction d7 is a direction obtained by tilting the reference alignment direction d3 so as to come closer to the pixel longitudinal direction D1.

An acute angle $\theta_8$ formed by the direction d8 in which the fourth slits 11a4 extend with respect to the pixel longitudinal direction D1 is equal to or smaller than an acute angle $\theta_4$ formed by the reference alignment direction d4 of the fourth liquid crystal domain D with respect to the pixel longitudinal direction D1 ($\theta_8 \leq \theta_4$). That is, it can be said that the direction d8 is a direction obtained by tilting the reference alignment direction d4 so as to come closer to the pixel longitudinal direction D1 or the same direction as the reference alignment direction d4.

In the following, the acute angles $\theta_1$, $\theta_2$, $\theta_3$, and $\theta_4$ formed by the respective reference alignment directions d1, d2, d3, and d4 of the liquid crystal domains A, B, C, and D with respect to the pixel longitudinal direction D1 are sometimes collectively referred to as "reference angle $\theta_R$." The reference angle $\theta_R$ (that is, each of the acute angles $\theta_1$, $\theta_2$, $\theta_3$, and $\theta_4$) is, in this case, substantially 45° (for example, from 40° to) 50°. Further, in the following, the acute angles $\theta_5$, $\theta_6$, $\theta_7$, and $\theta_8$ formed by the respective directions d5, d6, d7, and d8 in which the first slits 11a1, the second slits 11a2, the third slits 11a3, and the fourth slits 11a4 extend with respect to the pixel longitudinal direction D1 are sometimes collectively referred to as "slit angle $\theta_s$."

In the liquid crystal display apparatus 100 according to the first embodiment, further, each of a difference ($\theta_1-\theta_5$) between the acute angle $\theta_5$ and the acute angle $\theta_1$ and a difference ($\theta_3-\theta_7$) between the acute angle $\theta_7$ and the acute angle $\theta_3$ is larger than each of a difference ($\theta_2-\theta_6$) between the acute angle $\theta_6$ and the acute angle $\theta_2$ and a difference ($\theta_4-\theta_8$) between the acute angle $\theta_8$ and the acute angle $\theta_4$. That is, a difference ($\theta_R-\theta_S$) between the slit angle $\theta_S$ and the reference angle $\theta_R$ in the first liquid crystal domain A and the third liquid crystal domain C is larger than a difference ($\theta_R-\theta_S$) between the slit angle $\theta_S$ and the reference angle $\theta_R$ in the second liquid crystal domain B and the fourth liquid crystal domain D.

Figure 8:
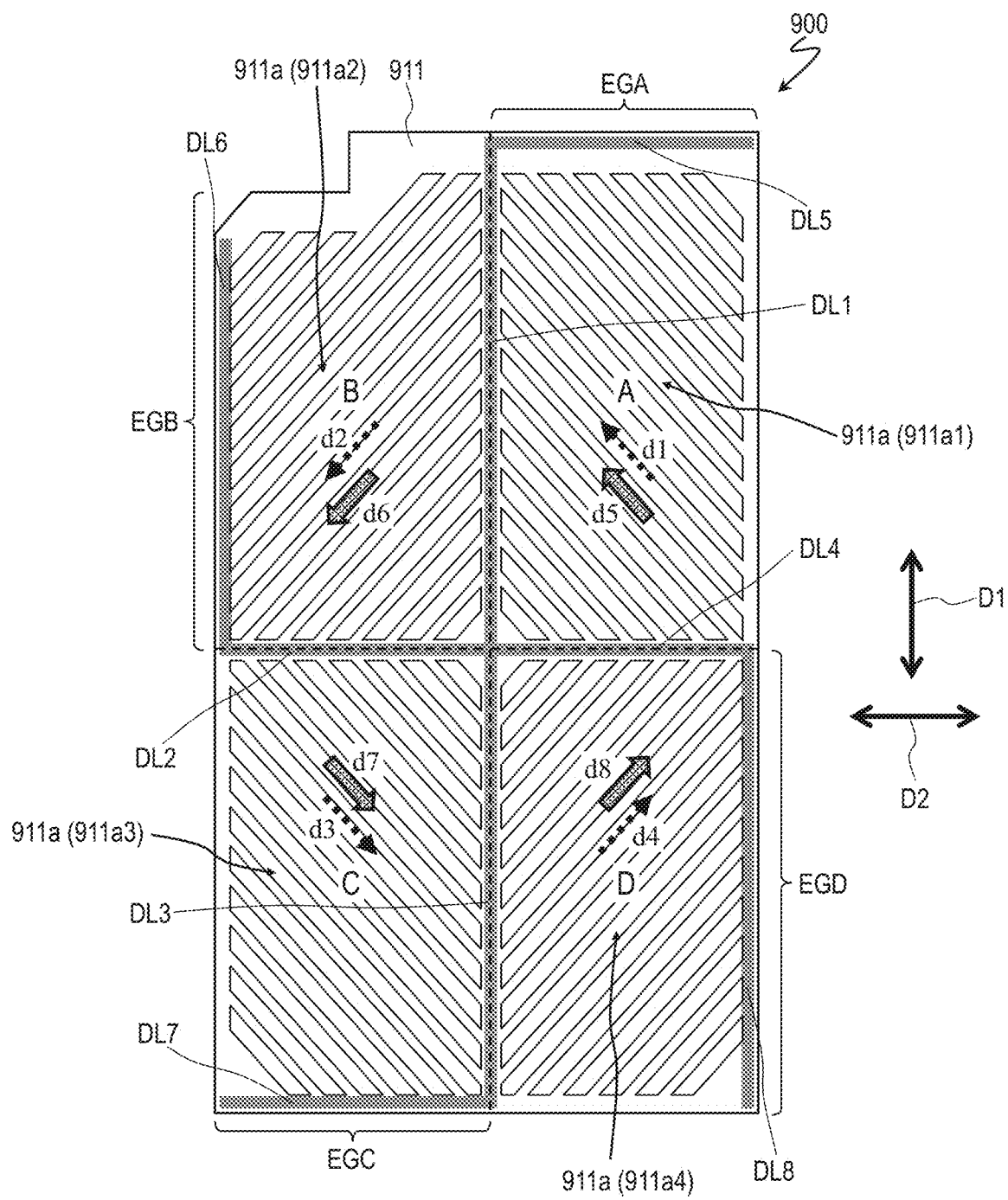
FIG. 8 is a plan view for illustrating a liquid crystal display apparatus 900 according to Comparative Example.
Figure 9:
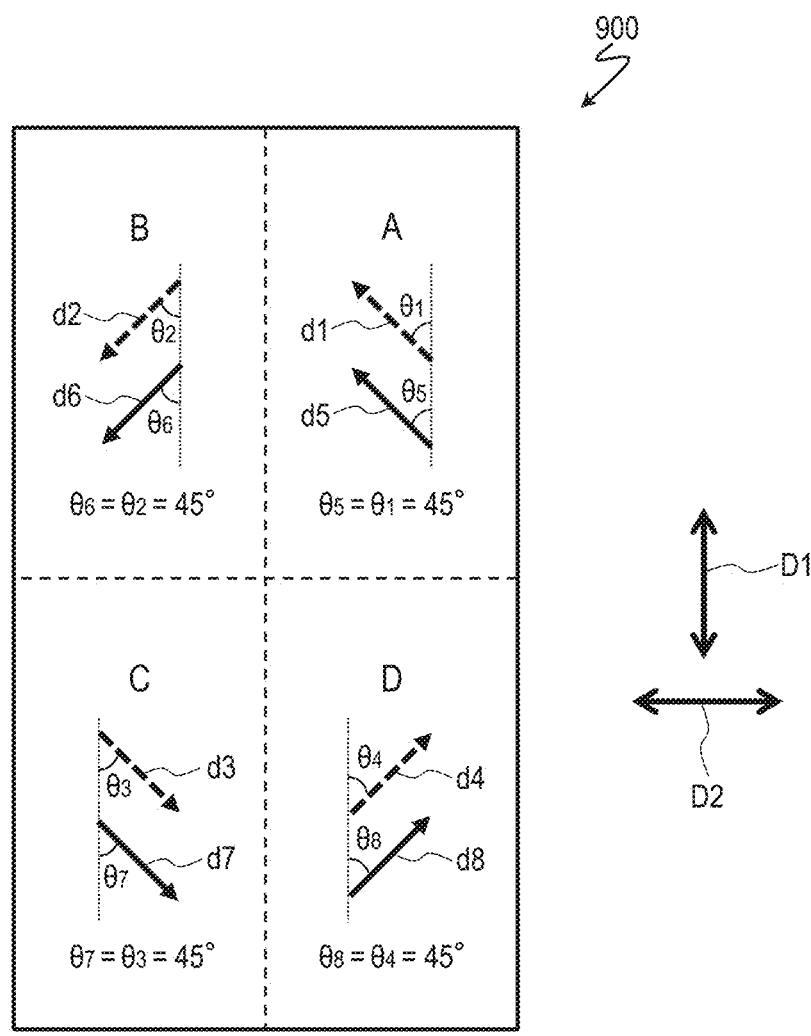
FIG. 9 is an explanatory view for illustrating relationships between the directions d5 to d8 in which the first to fourth slits 11a1 to 11a4 extend and the reference alignment directions d1 to d4 of the liquid crystal domains A to D in the liquid crystal display apparatus 900 according to Comparative Example.

When the first slits 11a1, the second slits 11a2, the third slits 11a3, and the fourth slits 11a4 are formed as described above, the transmittance can be more improved. Now, the reason therefor is described through comparison with a liquid crystal display apparatus 900 according to Comparative Example illustrated in FIG. 8 and FIG. 9.

In the liquid crystal display apparatus 900 according to Comparative Example, each pixel is subjected to alignment division similarly to the liquid crystal display apparatus 100, and the reference alignment directions d1, d2, d3, and d4 of the liquid crystal domains A, B, C, and D are the direction of 135°, the direction of 225°, the direction of 315°, and the direction of 45°, respectively.

A pixel electrode 911 of the liquid crystal display apparatus 900 according to Comparative Example includes a plurality of slits 911a. More specifically, the pixel electrode 911 includes a plurality of first slits 911a1, a plurality of second slits 911a2, a plurality of third slits 911a3, and a plurality of fourth slits 911a4. The plurality of first slits 911a1 are formed in a region corresponding to the first liquid crystal domain A, and extend in the direction d5. The plurality of second slits 911a2 are formed in a region corresponding to the second liquid crystal domain B, and extend in the direction d6. The plurality of third slits 911a3 are formed in a region corresponding to the third liquid crystal domain C, and extend in the direction d7. The plurality of fourth slits 911a4 are formed in a region corresponding to the fourth liquid crystal domain D, and extend in the direction d8.

In the liquid crystal display apparatus 900 according to Comparative Example, the direction d5 in which the first slits 911a1 extend, the direction d6 in which the second slits 911a2 extend, the direction d7 in which the third slits 911a3 extend, and the direction d8 in which the fourth slits 911a4 extend are the direction of 135°, the direction of 225°, the direction of 315°, and the direction of 45°, respectively.

Accordingly, the acute angle $\theta_5$ formed by the direction d5 in which the first slits 911a1 extend with respect to the pixel longitudinal direction D1 is equal to the acute angle $\theta_1$ formed by the reference alignment direction d1 of the first liquid crystal domain A with respect to the pixel longitudinal direction D1 ($\theta_5=\theta_1=45°$). That is, in the liquid crystal display apparatus 900 according to Comparative Example, the direction d5 is the same as the reference alignment direction d1.

Further, the acute angle $\theta_6$ formed by the direction d6 in which the second slits 911a2 extend with respect to the pixel longitudinal direction D1 is equal to the acute angle $\theta_2$ formed by the reference alignment direction d2 of the second liquid crystal domain B with respect to the pixel longitudinal direction D1 ($\theta_6=\theta_2=45°$). That is, in the liquid crystal display apparatus 900 according to Comparative Example, the direction d6 is the same as the reference alignment direction d2.

Further, the acute angle $\theta_7$ formed by the direction d7 in which the third slits 911a3 extend with respect to the pixel longitudinal direction D1 is equal to the acute angle $\theta_3$ formed by the reference alignment direction d3 of the third liquid crystal domain C with respect to the pixel longitudinal direction D1 ($\theta_7=\theta_{3\theta=45}°$). That is, in the liquid crystal display apparatus 900 according to Comparative Example, the direction d7 is the same as the reference alignment direction d3.

Further, the acute angle $\theta_8$ formed by the direction d8 in which the fourth slits 911a4 extend with respect to the pixel longitudinal direction D1 is equal to the acute angle $\theta_4$ formed by the reference alignment direction d4 of the fourth liquid crystal domain D with respect to the pixel longitudinal direction D1 ($\theta_8=\theta_4=45°$). That is, in the liquid crystal display apparatus 900 according to Comparative Example, the direction d8 is the same as the reference alignment direction d4.

As described above, in the liquid crystal display apparatus 900 according to Comparative Example, in each of the liquid crystal domains A, B, C, and D, the reference angle $\theta_R$ matches the slit angle $\theta_S$.

Figure 10A:
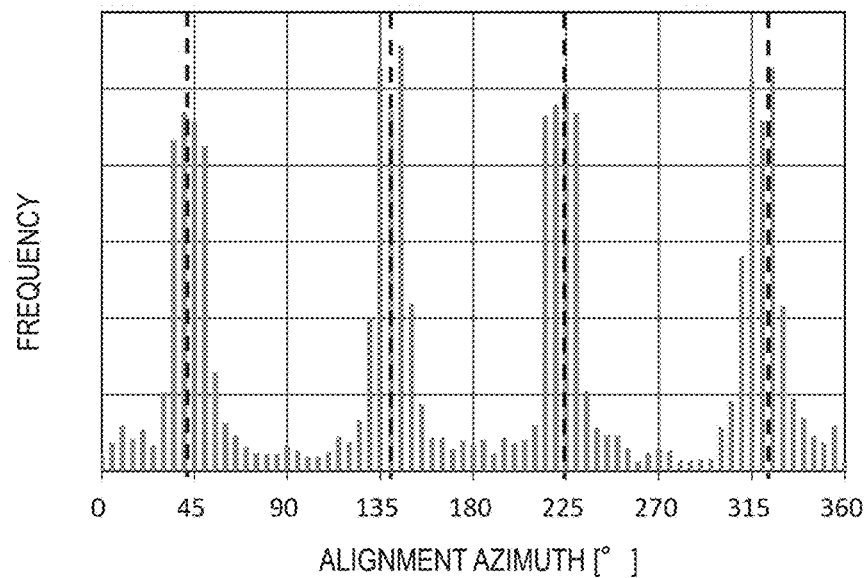
FIG. 10A is a histogram of an alignment azimuth of liquid crystal molecules in a pixel of the liquid crystal display apparatus 900 according to Comparative Example.

FIG. 10A is a histogram of an alignment azimuth of the liquid crystal molecules in the pixel of the liquid crystal display apparatus 900 according to Comparative Example. The histogram shown in FIG. 10A is obtained by an alignment simulation performed by liquid crystal simulation software. The broken line of FIG. 10A indicates a center of a peak of a frequency distribution (center in a case of being fitted to the Gaussian function). It can be said that the broken line of FIG. 10A indicates the actual reference alignment direction.

It is expected that, in each liquid crystal domain, liquid crystal molecules which align in the original reference alignment direction determined in accordance with the pre-tilt directions defined by the pair of alignment films (direction of 135° in the first liquid crystal domain A, direction of 225° in the second liquid crystal domain B, direction of 315° in the third liquid crystal domain C, and direction of 45° in the fourth liquid crystal domain D) are largest in number, and a symmetric distribution is obtained with respect to the original reference alignment direction. However, in actuality, as shown in FIG. 10A, such a distribution is not obtained.

Specifically, in the first liquid crystal domain A, the distribution of the alignment azimuth is slightly deviated from the direction of 135° being the original reference alignment direction toward the 180°-direction side, and the actual reference alignment direction is shifted from the direction of 135° toward the 180°-direction side. In the second liquid crystal domain B, the distribution of the alignment azimuth is slightly deviated from the direction of 225° being the original reference alignment direction toward the 180°-direction side, and the actual reference alignment direction is slightly shifted from the direction of 225° toward the 180°-direction side. In the third liquid crystal domain C, the distribution of the alignment azimuth is slightly deviated from the direction of 315° being the original reference alignment direction toward the 360°-direction side, and the actual reference alignment direction is shifted from the direction of 315° toward the 360°-direction side. In the fourth liquid crystal domain D, the distribution of the alignment azimuth is slightly deviated from the direction of 45° being the original reference alignment direction toward the 0°-direction side, and the actual reference alignment direction is shifted from the direction of 45° toward the 0°-direction side. As described above, in each liquid crystal domain, the alignment azimuth (actual reference alignment direction) of the liquid crystal molecules is shifted so as to come closer to the pixel transverse direction. It is considered that this shifting is caused by the influence of the oblique electric field generated in the vicinity of the edge of the pixel electrode 911. Further, this shift amount (deviation of the distribution of the alignment azimuth) is larger in the first liquid crystal domain A and the third liquid crystal domain C than in the second liquid crystal domain B and the fourth liquid crystal domain D.

As already described, in the liquid crystal display apparatus 100 according to the first embodiment, in at least a part of liquid crystal domains among the liquid crystal domains A, B, C, and D (in this case, at least the first liquid crystal domain A and the third liquid crystal domain C), the slit angle $\theta_S$ is smaller than the reference angle $\theta_R$. That is, in at least a part of liquid crystal domains, the direction in which the slits 11a extend is a direction obtained by tilting the reference alignment direction so as to come closer to the pixel longitudinal direction D1. Accordingly, such a shift of the alignment azimuth (shift of coming closer to the pixel transverse direction D2) that is caused in the liquid crystal display apparatus 900 according to Comparative Example is corrected, and thus the transmittance is improved.

Figure 10B:
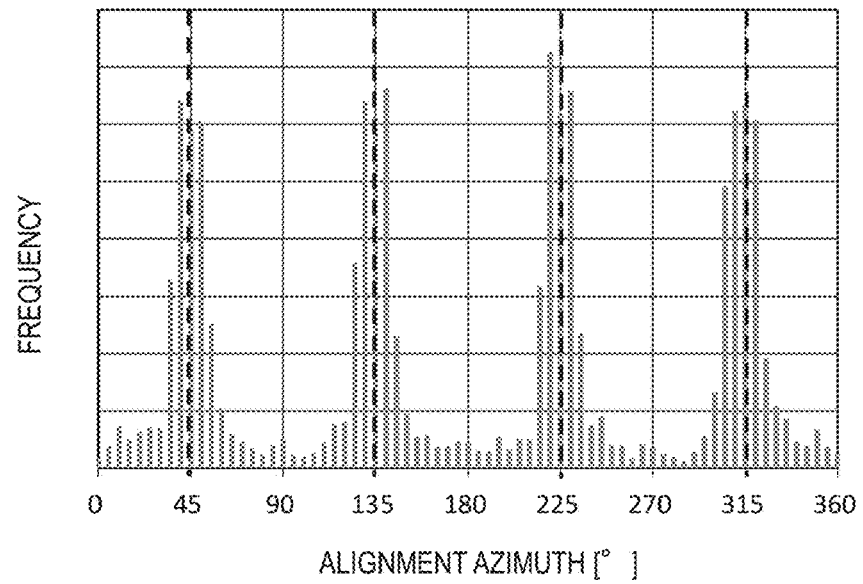
FIG. 10B is a histogram of an alignment azimuth of liquid crystal molecules in a pixel of the liquid crystal display apparatus 100.

FIG. 10B is a histogram of the alignment azimuth of the liquid crystal molecules in the pixel of the liquid crystal display apparatus 100 according to the first embodiment. It is understood from FIG. 10B that, in the liquid crystal display apparatus 100 according to the first embodiment, the shift of the alignment azimuth in each liquid crystal domain is corrected, and the actual reference alignment direction (indicated by the broken line similarly to FIG. 10A) in each liquid crystal domain is close to (almost matches in the example of FIG. 10B) the original reference alignment direction.

In the first liquid crystal domain A and the third liquid crystal domain C in which the shift amount of the alignment azimuth (deviation of the distribution of the alignment azimuth) is relatively large, when the slit angle $\theta_S$ is smaller than the reference angle $\theta_R$ (that is, when $\theta_5<\theta_1$ and $\theta_7<\theta_3$ are satisfied), an effect of improving the transmittance can be sufficiently obtained, but, also in the second liquid crystal domain B and/or the fourth liquid crystal domain D, the slit angle $\theta_S$ may be set to be smaller than the reference angle $\theta_R$ (that is, $\theta_6<\theta_2$ and/or $\theta_8<\theta_4$ may be satisfied). In this manner, the transmittance can be more improved.

Figure 11:
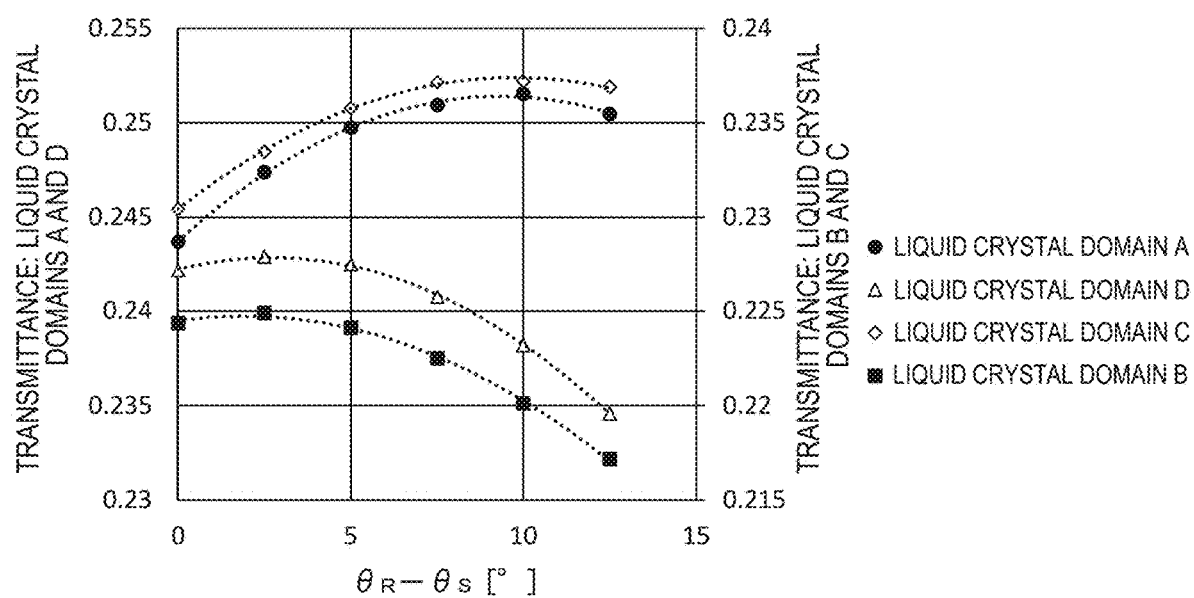
FIG. 11 is a graph for showing results of verifying, through an alignment simulation, transmittance by changing a slit angle $\theta_S$ for each of the liquid crystal domains A, B, C, and D.

Now, results of verifying, through an alignment simulation, the transmittance by changing the slit angle $\theta_S$ for each of the liquid crystal domains A, B, C, and D are described. The verification results are shown in FIG. 11. FIG. 11 is a graph in which the horizontal axis represents a difference ($\theta_R$-$\theta_S$) between the slit angle $\theta_S$ and the reference angle $\theta_R$, and the vertical axis represents transmittance.

It is understood from FIG. 11 that, in the first liquid crystal domain A and the third liquid crystal domain C, the transmittance is maximum when $\theta_R$-$\theta_S$ is 10°, and, in the second liquid crystal domain B and the fourth liquid crystal domain D, the transmittance is maximum when $\theta_R$-$\theta_S$ is 2.5°. In the example shown in FIG. 11, when $\theta_R$-$\theta_S$ is set to 10° in the first liquid crystal domain A and the third liquid crystal domain C and $\theta_R$-$\theta_S$ is set to 2.5° in the second liquid crystal domain B and the fourth liquid crystal domain D, the transmittance is improved by about 2%.

As understood from FIG. 11, from the viewpoint of improvement of transmittance, it is preferred that $\theta_R$-$\theta_S$ be 7.5° or more and 12.5° or less in the first liquid crystal domain A and the third liquid crystal domain C. That is, it is preferred that the difference ($\theta_1$-$\theta_5$) between the acute angle $\theta_5$ formed by the direction d5 in which the first slits 11a1 extend with respect to the pixel longitudinal direction D1 and the acute angle $\theta_1$ formed by the reference alignment direction d1 of the first liquid crystal domain A with respect to the pixel longitudinal direction D1 be 7.5° or more and 12.5° or less, and it is also preferred that the difference ($\theta_3$-$\theta_7$) between the acute angle $\theta_7$ formed by the direction d7 in which the third slits 11a3 extend with respect to the pixel longitudinal direction D1 and the acute angle $\theta_3$ formed by the reference alignment direction d3 of the third liquid crystal domain C with respect to the pixel longitudinal direction D1 be 7.5° or more and 12.5° or less.

Further, as similarly understood from FIG. 11, from the viewpoint of improvement of transmittance, it is preferred that $\theta_R$-$\theta_S$ be 0° or more and 5.0° or less in the second liquid crystal domain B and the fourth liquid crystal domain D. That is, it is preferred that the difference ($\theta_2$-$\theta_6$) between the acute angle $\theta_6$ formed by the direction d6 in which the second slits 11a2 extend with respect to the pixel longitudinal direction D1 and the acute angle $\theta_2$ formed by the reference alignment direction d2 of the second liquid crystal domain B with respect to the pixel longitudinal direction D1 be 0° or more and 5.00 or less, and it is also preferred that the difference ($\theta_4$-$\theta_8$) between the acute angle $\theta_8$ formed by the direction d8 in which the fourth slits 11a4 extend with respect to the pixel longitudinal direction D1 and the acute angle $\theta_4$ formed by the reference alignment direction d4 of the fourth liquid crystal domain D with respect to the pixel longitudinal direction D1 be 0° or more and 5.0° or less.

As described above, according to the at least one embodiment of the present invention, the transmittance of the 4D-RTN mode liquid crystal display apparatus can be improved.

A width S (see FIG. 2) of each of the plurality of slits 11a of the pixel electrode 11 is not particularly limited, but is, for example, 2.5 μm or more and 3.5 μm or less. Further, a gap L (see FIG. 2) between two slits 11a adjacent to each other is also not particularly limited, but is, for example, 1.5 μm or more and 3.0 μm or less.

The number of first slits 11a1, the number of second slits 11a2, the number of third slits 11a3, and the number of fourth slits 11a4 are not limited those in the illustrated example.

Second Embodiment

Figure 12:
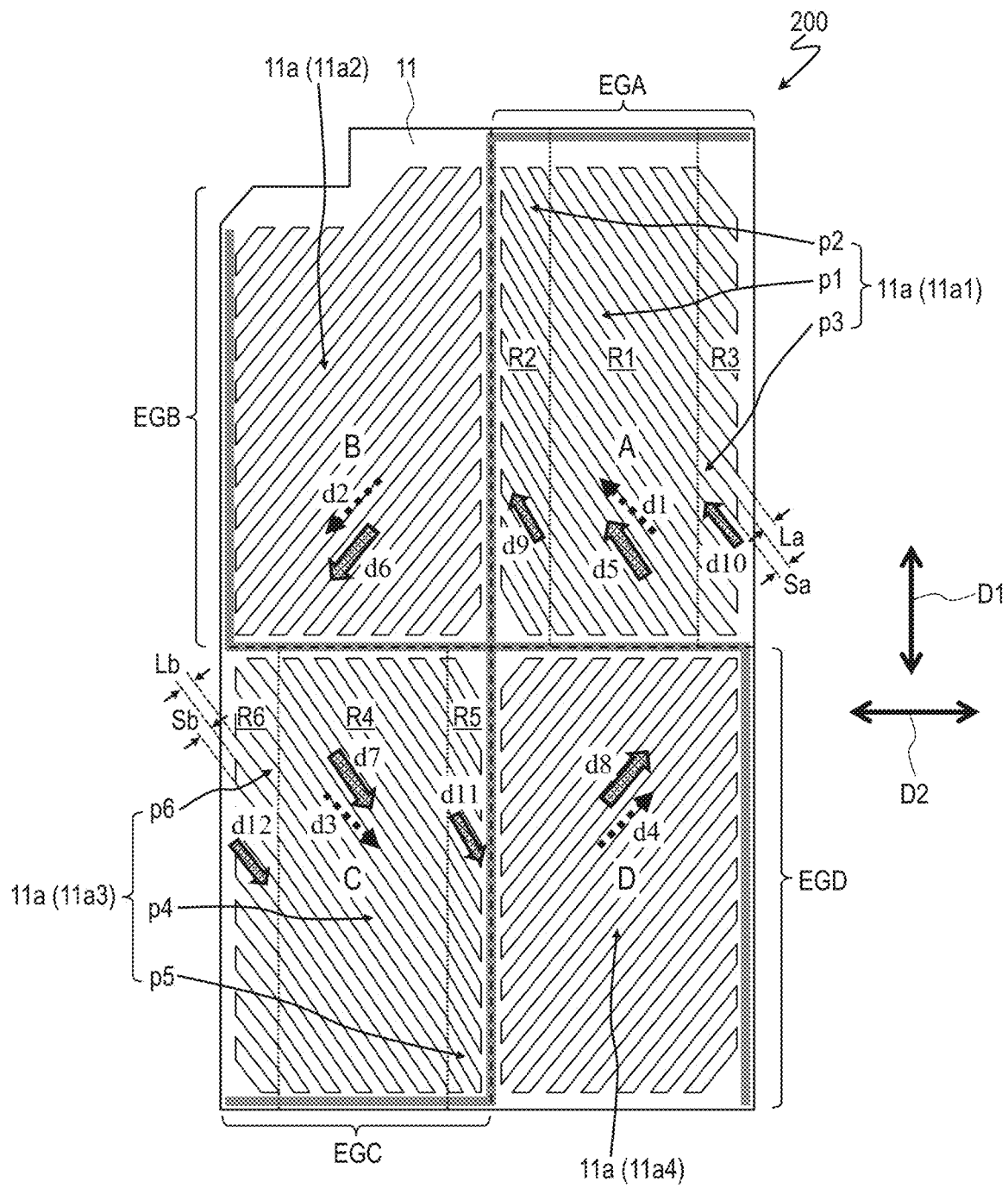
FIG. 12 is a plan view for schematically illustrating another liquid crystal display apparatus 200 according to another embodiment of the present invention.

With reference to FIG. 12, a liquid crystal display apparatus 200 according to a second embodiment of the present invention is described. FIG. 12 is a plan view for schematically illustrating the liquid crystal display apparatus 200. In the following, a difference of the liquid crystal display apparatus 200 from the liquid crystal display apparatus 100 according to the first embodiment is mainly described. Among components of the liquid crystal display apparatus 200, components having the same functions as the components of the liquid crystal display apparatus 100 are denoted by the same reference symbols, and description thereof is omitted (the same holds true also in the following embodiments).

Each pixel of the liquid crystal display apparatus 200 has the same multi-domain structure as that of the pixel P1 illustrated in FIG. 4. Accordingly, when a voltage is applied between the pixel electrode 11 and the counter electrode 21, in each pixel, four liquid crystal domains A, B, C, and D are formed.

The pixel electrode 11 of the liquid crystal display apparatus 200 includes, similarly to the pixel electrode 11 of the liquid crystal display apparatus 100 according to the first embodiment, the plurality of slits 11a, more specifically, the first slits 11a1, the second slits 11a2, the third slits 11a3, and the fourth slits 11a4. However, the liquid crystal display apparatus 200 according to the second embodiment is different from the liquid crystal display apparatus 100 according to the first embodiment in that the first slit 11a1 may include a part extending in a direction different from the direction d5, and in that the third slit 11a3 may include a part extending in a direction different from the direction d7. Now, with reference to FIG. 13 as well, this difference is described.

As illustrated in FIG. 12, a region corresponding to the first liquid crystal domain A of the pixel electrode 11 includes, in addition to a first region R1 in which the first slits 11a1 extend in the direction d5, a second region R2 in which the first slits 11a1 extend in a direction d9 different from the direction d5, and a third region R3 in which the first slits 11a1 extend in a direction d10 different from the direction d5 and the direction d9. The second region R2 is positioned between the first region R1 and the second liquid crystal domain B, and the third region R3 is positioned on the opposite side of the second region R2 with respect to the first region R1. That is, the second region R2 and the third region R3 are positioned on both sides of the first region R1 in the pixel transverse direction D2, and the first region R1 is positioned between the second region R2 and the third region R3.

The region corresponding to the first liquid crystal domain A of the pixel electrode 11 includes the first region R1, the second region R2, and the third region R3 described above, and hence, among the plurality of first slits 11a1, each of two or more (in the example illustrated in FIG. 12, five) first slits 11a1 formed across the first region R1, the second region R2, and the third region R3 includes a first part p1 extending in the direction d5, a second part p2 being positioned between the first part p1 and the second liquid crystal domain B and extending in the direction d9, and a third part p3 being positioned on the opposite side of the second part p2 with respect to the first part p1 and extending in the direction d10.

Figure 13:
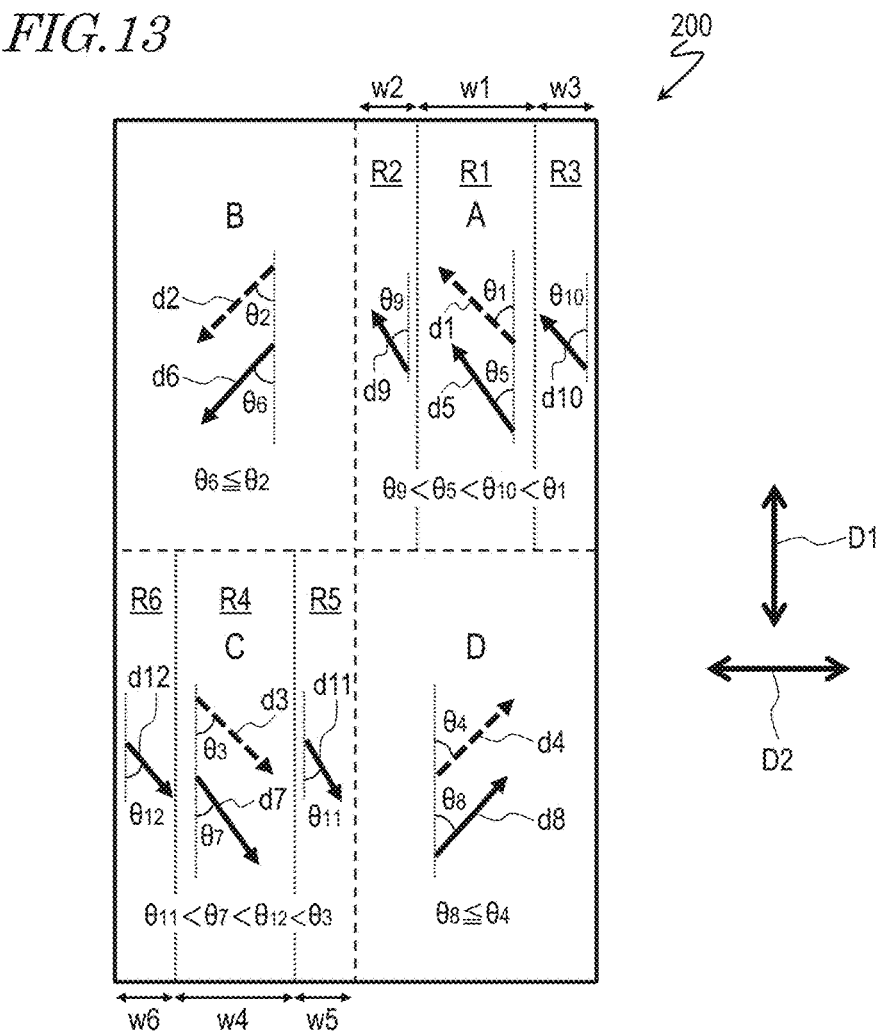
FIG. 13 is an explanatory view for illustrating relationships between directions d5 to d12 in which slits 11a extend and reference alignment directions d1 to d4 of liquid crystal domains A to D in the liquid crystal display apparatus 200.

As illustrated in FIG. 13, an acute angle $\theta_9$ formed by the direction d9 in which the second part p2 extends with respect to the pixel longitudinal direction D1 is smaller than the acute angle $\theta_5$ formed by the direction d5 in which the first part p1 extends with respect to the pixel longitudinal direction D1 ($\theta_9<\theta_5$), and an acute angle $\theta_{10}$ formed by the direction d10 in which the third part p3 extends with respect to the pixel longitudinal direction D1 is larger than the acute angle $\theta_5$ formed by the direction d5 in which the first part p1 extends with respect to the pixel longitudinal direction D1 ($\theta_5<\theta_{10}$). However, the acute angle $\theta_{10}$ is smaller than the acute angle $\theta_1$ formed by the reference alignment direction d1 of the first liquid crystal domain A with respect to the pixel longitudinal direction D1 ($\theta_{10}<\theta_1$).

Further, as illustrated in FIG. 12, a region corresponding to the third liquid crystal domain C of the pixel electrode 11 includes, in addition to a fourth region R4 in which the third slits 11a3 extend in the direction d7, a fifth region R5 in which the third slits 11a3 extend in a direction d11 different from the direction d7, and a sixth region R6 in which the third slits 11a3 extend in a direction d12 different from the direction d7 and the direction d11. The fifth region R5 is positioned between the fourth region R4 and the fourth liquid crystal domain D, and the sixth region R6 is positioned on the opposite side of the fifth region R5 with respect to the fourth region R4. That is, the fifth region R5 and the sixth region R6 are positioned on both sides of the fourth region R4 in the pixel transverse direction D2, and the fourth region R4 is positioned between the fifth region R5 and the sixth region R6.

The region corresponding to the third liquid crystal domain C of the pixel electrode 11 includes the fourth region R4, the fifth region R5, and the sixth region R6 described above, and hence, among the plurality of third slits 11a3, each of two or more (in the example illustrated in FIG. 12, four) third slits 11a3 formed across the fourth region R4, the fifth region R5, and the sixth region R6 includes a fourth part p4 extending in the direction d7, a fifth part p5 being positioned between the fourth part p4 and the fourth liquid crystal domain D and extending in the direction d11, and a sixth part p6 being positioned on the opposite side of the fifth part p5 with respect to the fourth part p4 and extending in the direction d12.

As illustrated in FIG. 13, an acute angle $\theta_{11}$ formed by the direction d11 in which the fifth part p5 extends with respect to the pixel longitudinal direction D1 is smaller than the acute angle $\theta_7$ formed by the direction d7 in which the fourth part p4 extends with respect to the pixel longitudinal direction D1 ($\theta_{11}<\theta_7$), and an acute angle $\theta_{12}$ formed by the direction d12 in which the sixth part p6 extends with respect to the pixel longitudinal direction D1 is larger than the acute angle $\theta_7$ formed by the direction d7 in which the fourth part p4 extends with respect to the pixel longitudinal direction D1 ($\theta_7<\theta_{12}$). However, the acute angle $\theta_{12}$ is smaller than the acute angle $\theta_3$ formed by the reference alignment direction d3 of the third liquid crystal domain C with respect to the pixel longitudinal direction D1 ($\theta_{12}<\theta_3$).

Further, in the liquid crystal display apparatus 200 according to the second embodiment, a ratio La/Sa of a gap La (see FIG. 12) between two first slits 11a1 adjacent to each other with respect to a width Sa (see FIG. 12) of the first slit 11a1 is smaller in the second region R2 than in the first region R1, and is larger in the third region R3 than in the first region R1. Moreover, a ratio Lb/Sb of a gap Lb (see FIG. 12) between two third slits 11a3 adjacent to each other with respect to a width Sb (see FIG. 12) of the third slit 11a3 is smaller in the fifth region R5 than in the fourth region R4, and is larger in the sixth region R6 than in the fourth region R4.

As described above, in the second embodiment, the plurality of first slits 11a1 formed in the region corresponding to the first liquid crystal domain A include the first slit 11a1 having the first part p1, the second part p2, and the third part p3 which extend in directions different from each other, and the plurality of third slits 11a3 formed in the region corresponding to the third liquid crystal domain C include the third slit 11a3 having the fourth part p4, the fifth part p5, and the sixth part p6 which extend in directions different from each other. In this manner, the transmittance can be more improved.

Figure 14:
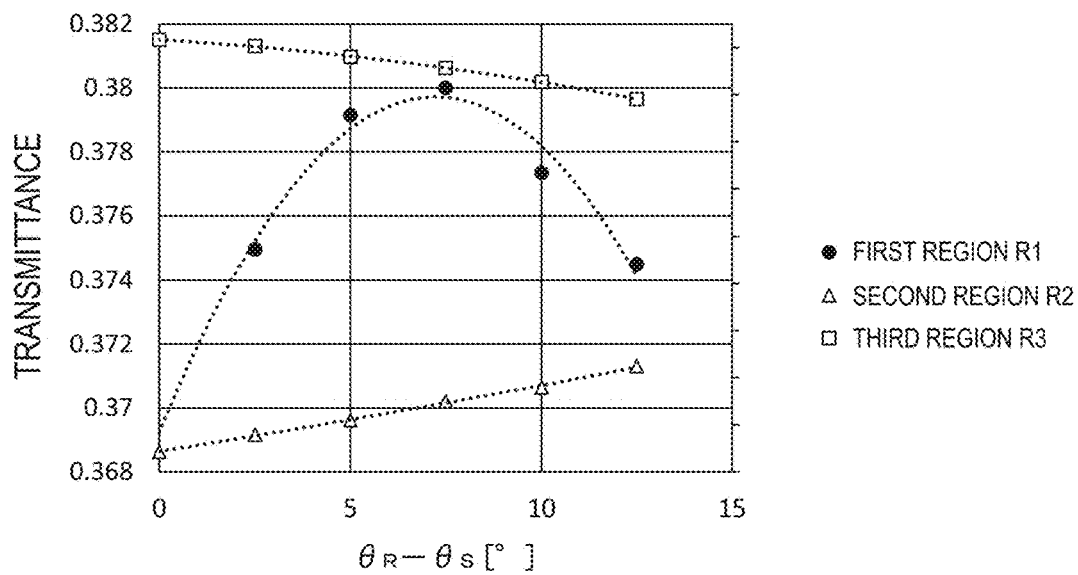
FIG. 14 is a graph for showing results of verifying, through an alignment simulation, transmittance by changing a slit angle $\theta_S$ for each of a first region R1, a second region R2, and a third region R3.

FIG. 14 is a graph for showing results obtained by verifying, through an alignment simulation, the transmittance by changing the slit angle $\theta_S$ for the first region R1, the second region R2, and the third region R3.

As understood from FIG. 14, in the first region R1, as the difference ($\theta_R-\theta_S$) between the slit angle $\theta_S$ and the reference angle $\theta_R$ becomes larger from zero, the transmittance once increases and then decreases. In the example shown in FIG. 14, the transmittance is maximum when the difference between the slit angle $\theta_S$ and the reference angle $\theta_R$ is 7.5°. Further, in the second region R2, the transmittance becomes higher as the difference between the slit angle $\theta_S$ and the reference angle $\theta_R$ becomes larger, and, in the third region R3, the transmittance becomes higher as the difference between the slit angle $\theta_S$ and the reference angle $\theta_R$ becomes smaller.

As understood from those results, the transmittance can be more improved when the slit angles $\theta_S$ are set as follows. While, in the first region R1, the slit angle $\theta_S$ (that is, the acute angle $\theta_5$) is set so that the transmittance is almost maximum, in the second region R2, the slit angle $\theta_S$ (that is, the acute angle $\theta_9$) is set to be smaller than that in the first region R1 (that is, $\theta_9<\theta_5$), and, in the third region R3, the slit angle $\theta_S$ (that is, the acute angle $\theta_{10}$) is set to be larger than that in the first region R1 (that is, $\theta_5<\theta_{10}$).

Similarly, the transmittance can be more improved when the slit angles $\theta_S$ are set as follows. While, in the fourth region R4, the slit angle $\theta_S$ (that is, the acute angle $\theta_7$) is set so that the transmittance is almost maximum, in the fifth region R5, the slit angle $\theta_S$ (that is, the acute angle $\theta_{11}$) is set to be smaller than that in the fourth region R4 (that is, $\theta_{11}<\theta_7$), and, in the sixth region R6, the slit angle $\theta_S$ (that is, the acute angle $\theta_{12}$) is set to be larger than that in the fourth region R4 (that is, $\theta_7<\theta_{12}$).

When the configuration satisfying "$\theta_9<\theta_5<\theta_{10}$" is adopted in the region corresponding to the first liquid crystal domain A as described above, as exemplified in the second embodiment, it is preferred that the ratio La/Sa of the gap La between the first slits 11a1 with respect to the width Sa of the first slit 11a1 be smaller in the second region R2 than in the first region R1, and be larger in the third region R3 than in the first region R1.

When the same ratio La/Sa is set in the first region R1, the second region R2, and the third region R3, the width Sa of the first slit 11a1 is decreased in the second region R2 so that an effect of narrowing the dark line is weakened, and thus there is a fear of causing loss of transmittance. Further, the width Sa of the first slit 11a1 is increased in the third region R3, and thus there is a fear of causing loss of transmittance. For example, in a case in which the direction d5 in which the first part p1 of the first slit 11a1 extends is a direction of 127.5°, the direction d9 in which the second part p2 extends is a direction of 122.5°, and the direction d10 in which the third part p3 extends is a direction of 132.5°, when the width Sa and the gap La of the first slits 11a1 in the first region R1 are 3 μm and 2 μm, respectively (La/Sa=2/3), the width Sa and the gap La of the first slits 11a1 in the second region R2 are 2.64 μm and 1.77 μm, respectively, and the width Sa and the gap La of the first slits 11a1 in the third region R3 are 3.33 μm and 2.20 μm, respectively.

In contrast, when the ratio La/Sa is set to be smaller in the second region R2 than in the first region R1, and larger in the third region R3 than in the first region R1, the reduction amount of the width Sa of the first slit 11a1 in the second region R2 can be reduced, and the increase amount of the width Sa of the first slit 11a1 in the third region R3 can be reduced. Thus, the loss of the transmittance can be suppressed. For example, in a case in which the direction d5 is a direction of 127.5°, the direction d9 is a direction of 122.5°, and the direction d10 is a direction of 132.5°, when the width Sa and the gap La of the first slits 11a1 in the first region R1 are 3 μm and 2 μm, respectively (La/Sa=2/3), the width Sa and the gap La of the first slits 11a1 in the second region R2 are 2.8 μm and 1.6 μm, respectively, and the width Sa and the gap La of the first slits 11a1 in the third region R3 are 3.19 μm and 2.35 μm, respectively.

Similarly, when the configuration satisfying "$\theta_{11}<\theta_7<\theta_{12}$" is adopted in the region corresponding to the third liquid crystal domain C, it is preferred that the ratio Lb/Sb of the gap Lb between the third slits 11a3 with respect to the width Sb of the third slit 11a3 be smaller in the fifth region R5 than in the fourth region R4, and be larger in the sixth region R6 than in the fourth region R4.

The same ratio La/Sa may be set in the first region R1, the second region R2, and the third region R3, or the same ratio Lb/Sb may be set in the fourth region R4, the fifth region R5, and the sixth region R6.

Further, widths w1, w2, and w3 (see FIG. 13) of the first region R1, the second region R2, and the third region R3 along the pixel transverse direction D2 are not particularly limited, but typically, each of the widths w2 and w3 of the second region R2 and the third region R3 is smaller than the width w1 of the first region R1. The width w2 of the second region R2 is, for example, 5 μm or more and 15 μm or less (5% or more and 15% or less of a width of the first liquid crystal domain A along the pixel transverse direction D2). The width w3 of the third region R3 is, for example, 5 μm or more and 15 μm or less (5% or more and 15% or less of the width of the first liquid crystal domain A along the pixel transverse direction D2).

Similarly, widths w4, w5, and w6 (see FIG. 13) of the fourth region R4, the fifth region R5, and the sixth region R6 along the pixel transverse direction D2 are not particularly limited, but typically, each of the widths w5 and w6 of the fifth region R5 and the sixth region R6 is smaller than the width w4 of the fourth region R4. The width w5 of the fifth region R5 is, for example, 5 μm or more and 15 μm or less (5% or more and 15% or less of a width of the third liquid crystal domain C along the pixel transverse direction D2). The width w6 of the sixth region R6 is, for example, 5 μm or more and 15 μm or less (5% or more and 15% or less of the width of the third liquid crystal domain C along the pixel transverse direction D2).

Third Embodiment

Figure 15A:
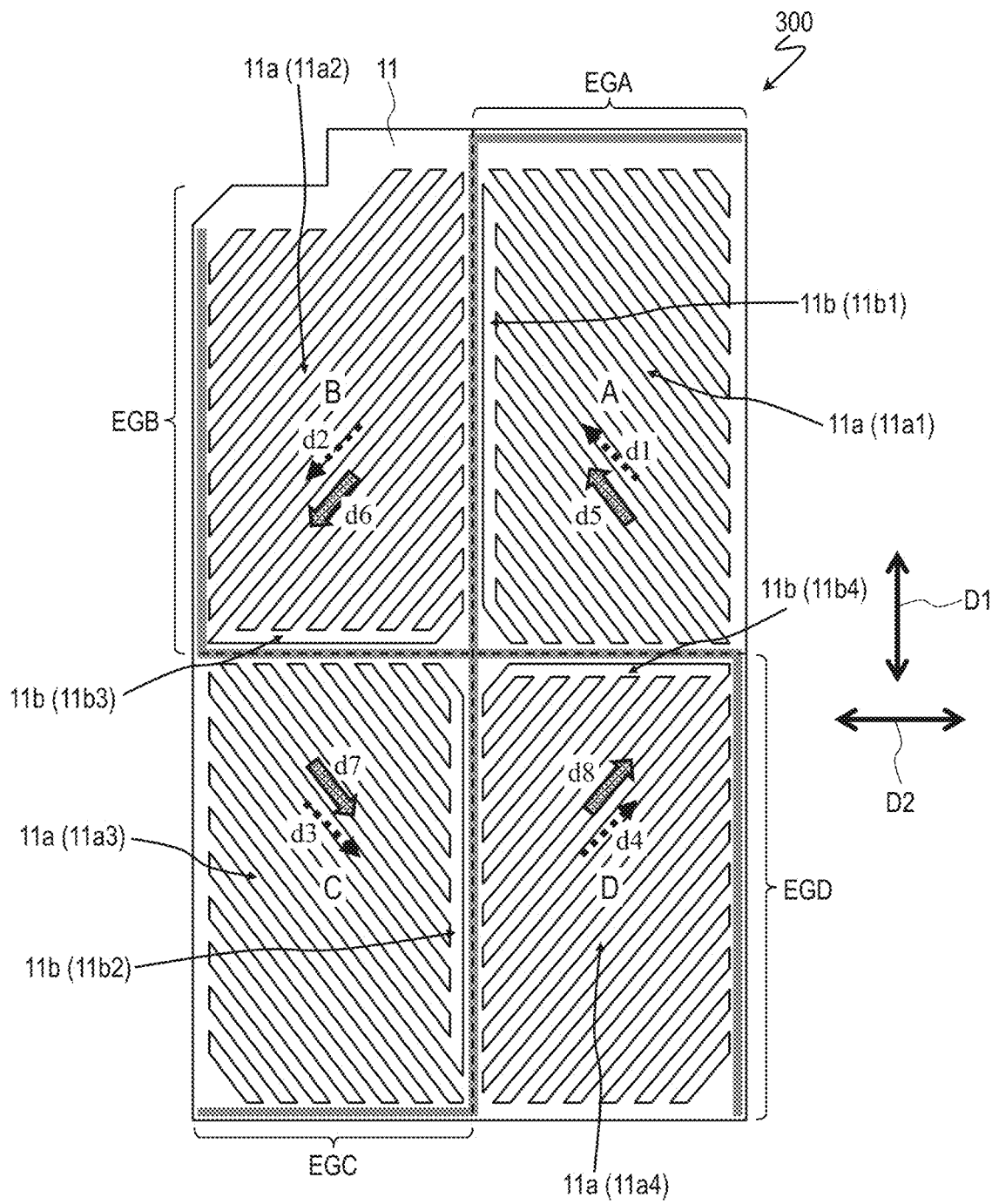
FIG. 15A is a plan view for schematically illustrating further another liquid crystal display apparatus 300 according to still another embodiment of the present invention.

With reference to FIG. 15A, a liquid crystal display apparatus 300 according to a third embodiment of the present invention is described. FIG. 15A is a plan view for schematically illustrating the liquid crystal display apparatus 300.

Each pixel of the liquid crystal display apparatus 300 also has the same multi-domain structure as that of the pixel P1 illustrated in FIG. 4. Accordingly, when a voltage is applied between the pixel electrode 11 and the counter electrode 21, in each pixel, four liquid crystal domains A, B, C, and D are formed.

The pixel electrode 11 of the liquid crystal display apparatus 300 includes, similarly to the pixel electrode 11 of the liquid crystal display apparatus 100 according to the first embodiment, the plurality of slits 11a, more specifically, the first slits 11a1, the second slits 11a2, the third slits 11a3, and the fourth slits 11a4. However, the liquid crystal display apparatus 300 according to the third embodiment is different from the liquid crystal display apparatus 100 according to the first embodiment in that the pixel electrode 11 includes a plurality of connection slits 11b each of which connects two or more slits 11a. Now, this difference is described.

As illustrated in FIG. 15A, the plurality of connection slits 11b of the pixel electrode 11 include a first connection slit 11b1 and a second connection slit 11b2.

The first connection slit 11b1 is formed in the region corresponding to the first liquid crystal domain A. The first connection slit 11b1 is positioned in the vicinity of the boundary between the first liquid crystal domain A and the second liquid crystal domain B, and extends in the pixel longitudinal direction D1. The first connection slit 11b1 connects end portions on the second liquid crystal domain B side of two or more first slits 11a1 among the plurality of first slits 11a1 to each other.

The second connection slit 11b2 is formed in the region corresponding to the third liquid crystal domain C. The second connection slit 11b2 is positioned in the vicinity of the boundary between the third liquid crystal domain C and the fourth liquid crystal domain D, and extends in the pixel longitudinal direction D1. The second connection slit 11b2 connects end portions on the fourth liquid crystal domain D side of two or more third slits 11a3 among the plurality of third slits 11a3 to each other.

The plurality of connection slits 11b further include a third connection slit 11b3 and a fourth connection slit 11b4.

The third connection slit 11b3 is formed in the region corresponding to the second liquid crystal domain B. The third connection slit 11b3 is positioned in the vicinity of the boundary between the second liquid crystal domain B and the third liquid crystal domain C, and extends in the pixel transverse direction D2. The third connection slit 11b3 connects end portions on the third liquid crystal domain C side of two or more second slits 11a2 among the plurality of second slits 11a2 to each other.

The fourth connection slit 11b4 is formed in the region corresponding to the fourth liquid crystal domain D. The fourth connection slit 11b4 is positioned in the vicinity of the boundary between the fourth liquid crystal domain D and the first liquid crystal domain A, and extends in the pixel transverse direction D2. The fourth connection slit 11b4 connects end portions on the first liquid crystal domain A side of two or more fourth slits 11a4 among the plurality of fourth slits 11a4 to each other.

As already described, in each liquid crystal domain, when the slit angle $\theta_S$ is set to be different from the reference angle $\theta_R$, and the direction in which the slits 11a extend is brought closer to the pixel longitudinal direction D1, the transmittance may be improved. However, when the difference ($\theta_R$-$\theta_S$) between the slit angle $\theta_S$ and the reference angle $\theta_R$ is excessively increased, the pitch of the slits 11a is excessively decreased. Thus, there is a fear in that pattern formation becomes difficult. As in the third embodiment, when the pixel electrode 11 includes the plurality of connection slits 11b (which are each a slit having a slit angle $\theta_S$ corresponding to 0° or 90°), the difference ($\theta_R$-$\theta_S$) between the slit angle $\theta_S$ and the reference angle $\theta_R$ can be effectively increased without the pattern formation becoming difficult, and hence the transmittance can be sufficiently improved.

Table 1 shows results of estimating, through an alignment simulation, a transmittance improvement effect with respect to the liquid crystal display apparatus 900 according to Comparative Example, in the liquid crystal display apparatus 100 according to the first embodiment, the liquid crystal display apparatus 200 according to the second embodiment, and the liquid crystal display apparatus 300 according to the third embodiment.

TABLE 1

| First embodiment | Improvement by 1.5% |
|---|---|
| Second embodiment | Improvement by 1.6% |
| Third embodiment | Improvement by 2.2% |

It is understood from Table 1 that, in all of the liquid crystal display apparatus 100 according to the first embodiment, the liquid crystal display apparatus 200 according to the second embodiment, and the liquid crystal display apparatus 300 according to the third embodiment, the transmittance is improved as compared to the liquid crystal display apparatus 900 according to Comparative Example.

The number of first slits 11a1, the number of second slits 11a2, the number of third slits 11a3, and the number of fourth slits 11a4 are not limited to those in the example illustrated in FIG. 15A, and hence the number of slits 11a to be connected by each connection slit 11b is also not limited to that in the example illustrated in FIG. 15A.

Figure 15B:
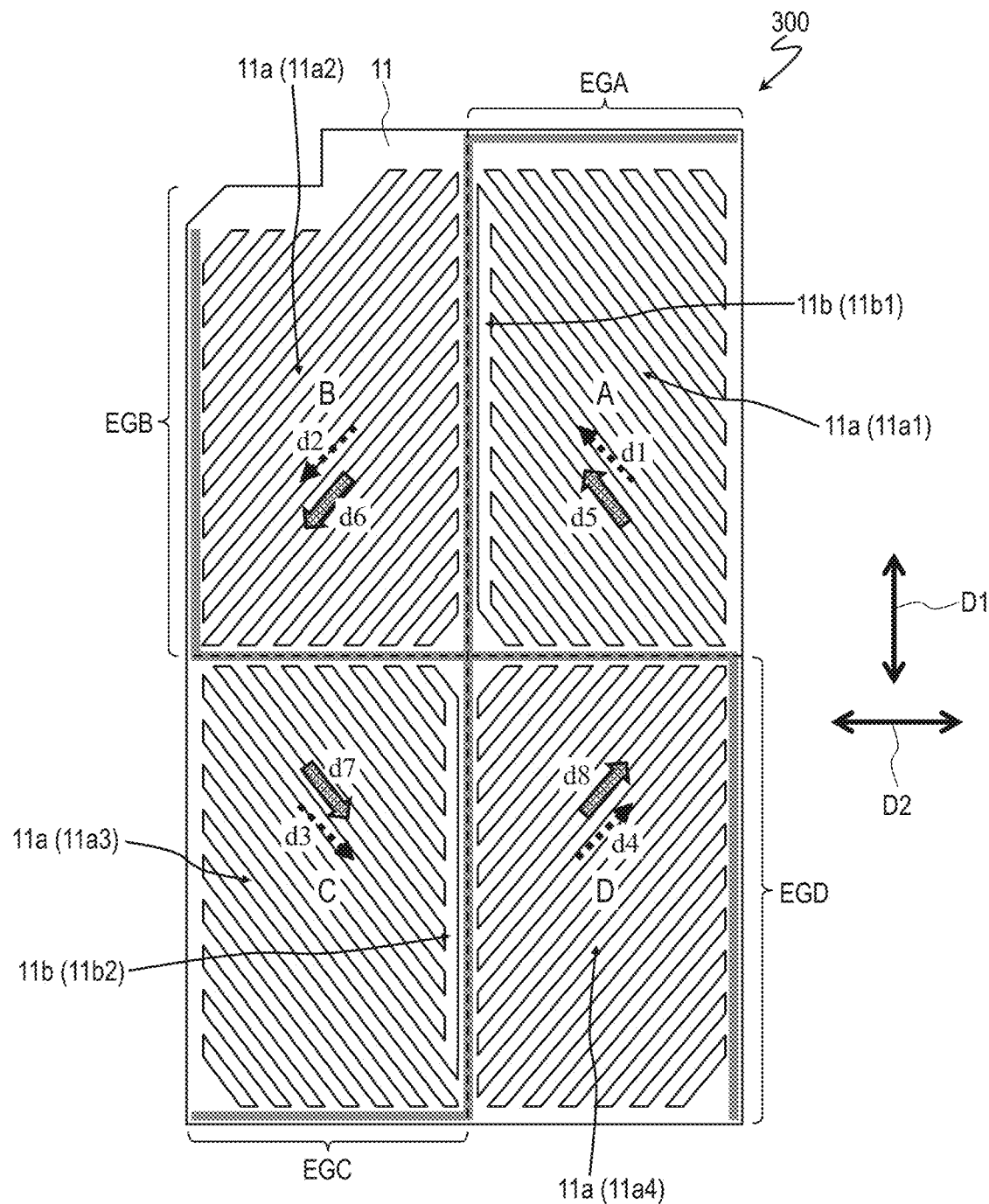
FIG. 15B is a plan view for illustrating an example of another configuration of the liquid crystal display apparatus 300.

Further, as illustrated in FIG. 15B, among the plurality of connection slits 11b, the third connection slit 11b3 and the fourth connection slit 11b4 may be omitted. For example, as already described, in the second liquid crystal domain B and the fourth liquid crystal domain D, the slit angle $\theta_S$ and the reference angle $\theta_R$ may be the same. In this case, the third connection slit 11b3 and the fourth connection slit 11b4 may be omitted.

Other Multi-Domain Structure

Figure 16:
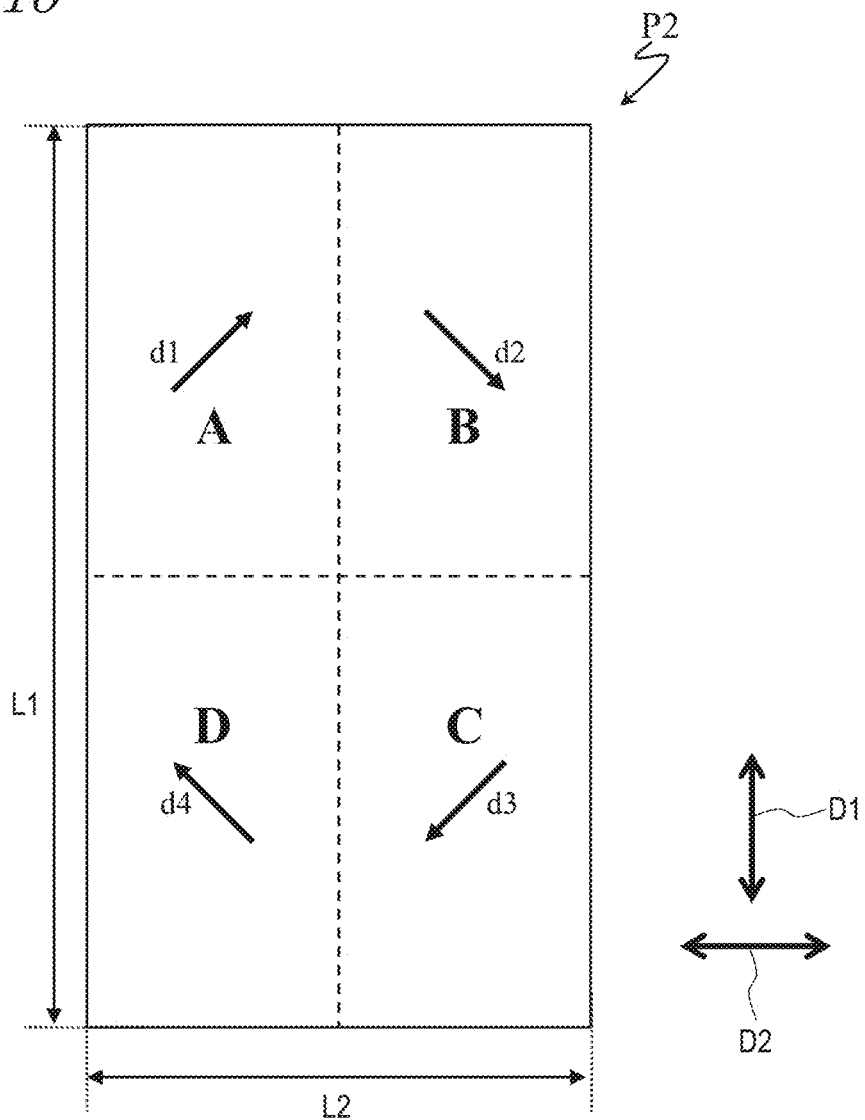
FIG. 16 is a view for illustrating a multi-domain structure of a pixel P2.

The multi-domain structure is not limited to that in the example given in the description so far. Such a multi-domain structure as that in a pixel P2 illustrated in FIG. 16 may be adopted. The pixel P2 includes four liquid crystal domains A to D similarly to the pixel P1 illustrated in FIG. 4.

The four liquid crystal domains A, B, C, and D are each adjacent to other liquid crystal domains, and are arranged in a matrix pattern of two rows and two columns. The reference alignment direction d1 of the first liquid crystal domain A is the direction of substantially 45°, the reference alignment direction d2 of the second liquid crystal domain B is the direction of substantially 315°, the reference alignment direction d3 of the third liquid crystal domain C is the direction of substantially 225°, and the reference alignment direction d4 of the fourth liquid crystal domain D is the direction of substantially 135°. That is, the reference alignment directions d1, d2, d3, and d4 in the pixel P2 are directions corresponding to the reference alignment directions d4, d3, d2, and d1 in the pixel P1, respectively.

The first liquid crystal domain A and the second liquid crystal domain B are adjacent to each other along the pixel transverse direction D2, and the third liquid crystal domain C and the fourth liquid crystal domain D are adjacent to each other along the pixel transverse direction D2. Further, the first liquid crystal domain A and the fourth liquid crystal domain D are adjacent to each other along the pixel longitudinal direction D1, and the second liquid crystal domain B and the third liquid crystal domain C are adjacent to each other along the pixel longitudinal direction D1.

Figure 17A:
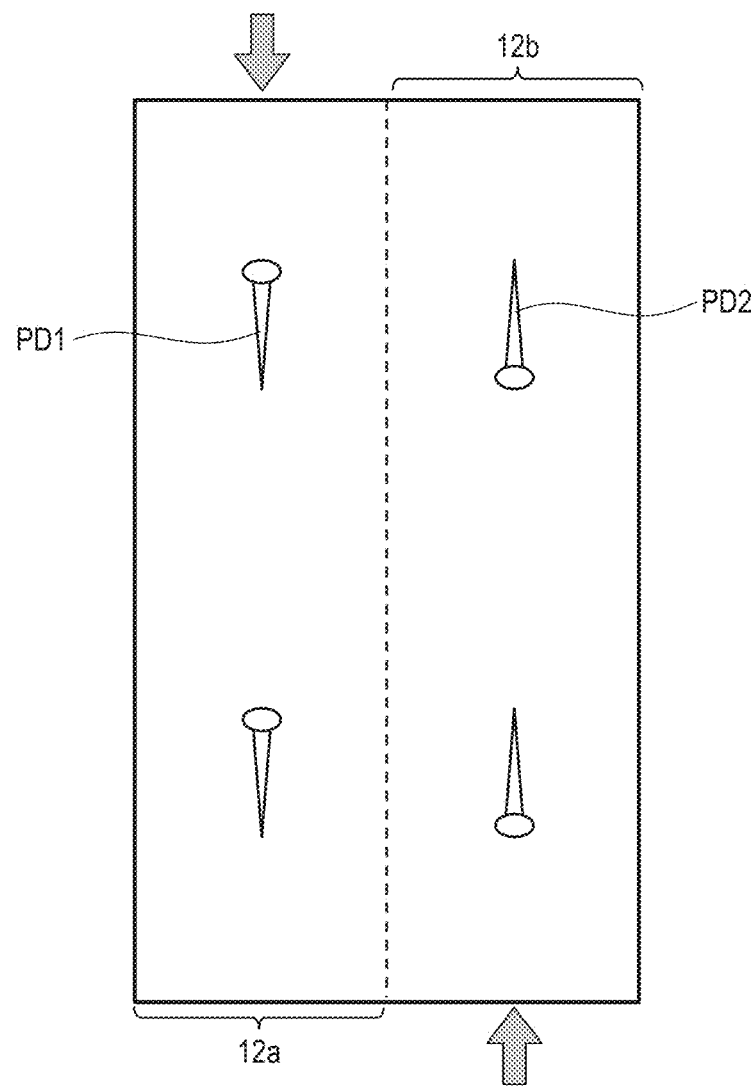
FIG. 17A is an explanatory view for illustrating a method for obtaining the multi-domain structure of the pixel P2.
Figure 17B:
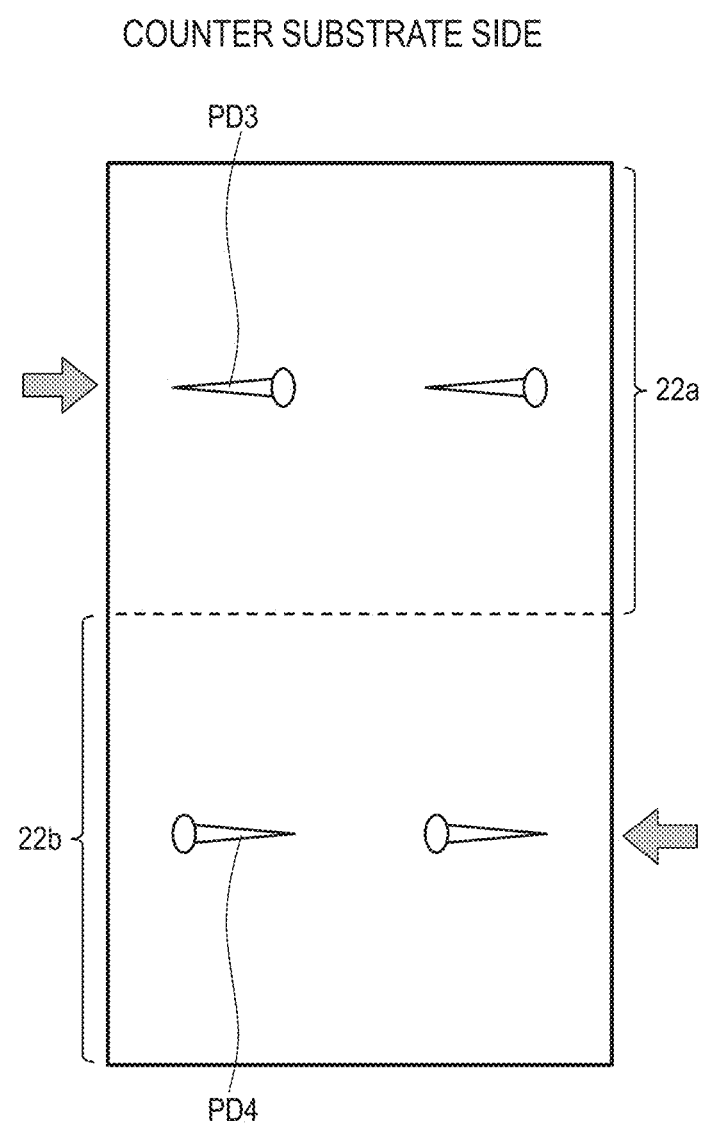
FIG. 17B is an explanatory view for illustrating the method for obtaining the multi-domain structure of the pixel P2.
Figure 17C:
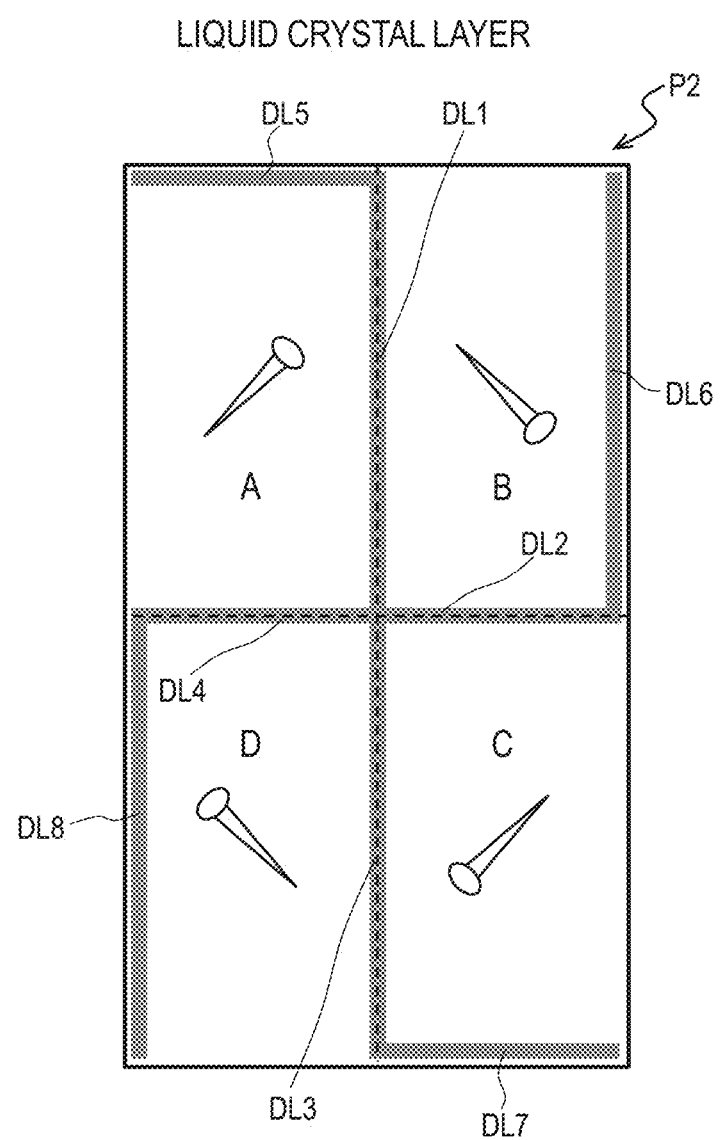
FIG. 17C is an explanatory view for illustrating the method for obtaining the multi-domain structure of the pixel P2.

When the active matrix substrate 10 subjected to an alignment treatment as illustrated in FIG. 17A and the counter substrate 20 subjected to an alignment treatment as illustrated in FIG. 17B are bonded to each other, the pixel P2 subjected to alignment division as illustrated in FIG. 17C can be formed. In the pixel P2, the dark lines DL1 to DL8 have a swastika shape (specifically, a left-facing swastika shape) as a whole.

Figure 18:
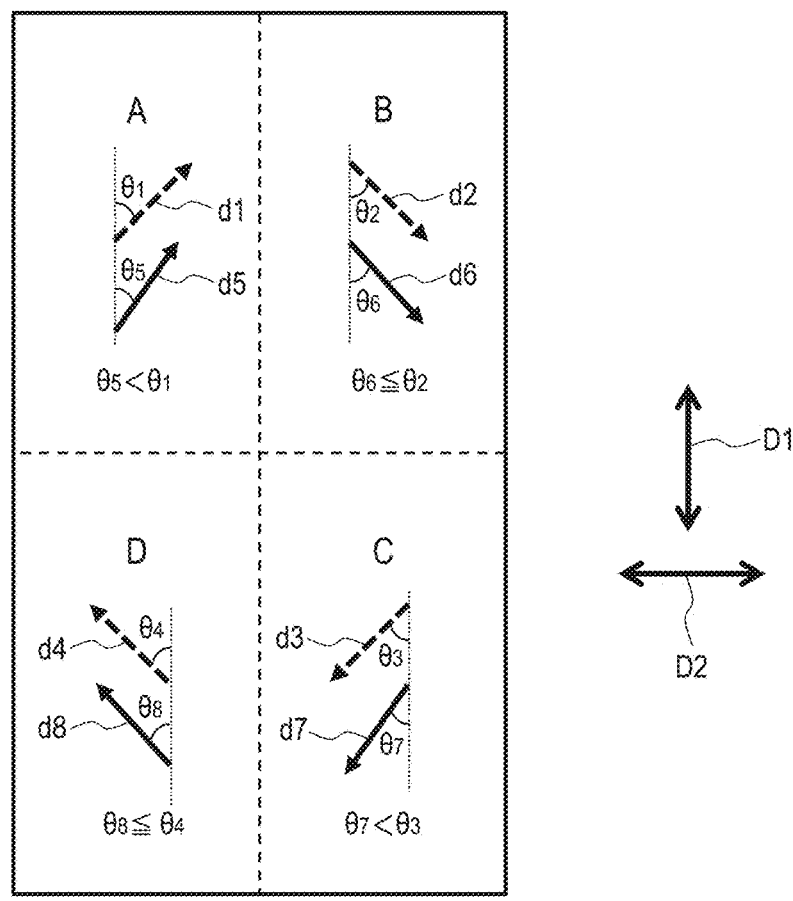
FIG. 18 is an explanatory view for illustrating relationships between directions d5 to d8 in which first to fourth slits 11a1 to 11a4 extend and reference reference alignment directions d1 to d4 of liquid crystal domains A to D in a case in which the multi-domain structure of the pixel P2 is adopted.

Even in a case in which such a multi-domain structure as that in the pixel P2 is adopted, when the relationships between the directions d5, d6, d7, and d8 in which the first slits 11a1, the second slits 11a2, the third slits 11a3, and the fourth slits 11a4 extend and the reference alignment directions d1, d2, d3, and d4 of the liquid crystal domains A, B, C, and D are set similarly to those in the liquid crystal display apparatus 100 according to the first embodiment as illustrated in FIG. 18, an effect similar to that in the liquid crystal display apparatus 100 according to the first embodiment can be obtained.

As illustrated in FIG. 18, the acute angle $\theta_5$ formed by the direction d5 in which the first slits 11a1 extend with respect to the pixel longitudinal direction D1 is smaller than the acute angle $\theta_1$ formed by the reference alignment direction d1 of the first liquid crystal domain A with respect to the pixel longitudinal direction D1 ($\theta_5 < \theta_1$), and the acute angle $\theta_6$ formed by the direction d6 in which the second slits 11a2 extend with respect to the pixel longitudinal direction D1 is equal to or smaller than the acute angle $\theta_2$ formed by the reference alignment direction d2 of the second liquid crystal domain B with respect to the pixel longitudinal direction D1 ($\theta_6 \leq \theta_2$). Further, the acute angle $\theta_7$ formed by the direction d7 in which the third slits 11a3 extend with respect to the pixel longitudinal direction D1 is smaller than the acute angle $\theta_3$ formed by the reference alignment direction d3 of the third liquid crystal domain C with respect to the pixel longitudinal direction D1 ($\theta_7 > \theta_3$), and the acute angle $\theta_8$ formed by the direction d8 in which the fourth slits 11a4 extend with respect to the pixel longitudinal direction D1 is equal to or smaller than the acute angle $\theta_4$ formed by the reference alignment direction d4 of the fourth liquid crystal domain D with respect to the pixel longitudinal direction D1 ($\theta_8 \leq \theta_4$).

Further, each of the difference ($\theta_1$-$\theta_5$) between the acute angle $\theta_5$ and the acute angle $\theta_1$ and the difference ($\theta_3$-$\theta_7$) between the acute angle $\theta_7$ and the acute angle $\theta_3$ is larger than each of the difference ($\theta_2$-$\theta_6$) between the acute angle $\theta_6$ and the acute angle $\theta_2$ and the difference ($\theta_4$-$\theta_8$) between the acute angle $\theta_8$ and the acute angle $\theta_4$. That is, the difference ($\theta_R$-$\theta_S$) between the slit angle $\theta_S$ and the reference angle $\theta_R$ in the first liquid crystal domain A and the third liquid crystal domain C is larger than the difference ($\theta_R$-$\theta_S$) between the slit angle $\theta_S$ and the reference angle $\theta_R$ in the second liquid crystal domain B and the fourth liquid crystal domain D.

When the first slits 11a1, the second slits 11a2, the third slits 11a3, and the fourth slits 11a4 are formed as described above, similarly to the liquid crystal display apparatus 100 according to the first embodiment, the transmittance can be improved.

Further, in a case in which such a multi-domain structure as that in the pixel P2 is adopted, when a configuration similar to that in the liquid crystal display apparatus 200 according to the second embodiment is used, an effect similar to that in the liquid crystal display apparatus 200 according to the second embodiment can be obtained. Moreover, in a case in which such a multi-domain structure as that in the pixel P2 is adopted, when a configuration similar to that in the liquid crystal display apparatus 300 according to the third embodiment is used, an effect similar to that in the liquid crystal display apparatus 300 according to the third embodiment can be obtained.

According to the at least one embodiment of the present invention, it is possible to improve the transmittance in the VA-mode liquid crystal display apparatus in which the multi-domain structure is formed by defining the pre-tilt directions by the alignment films. The liquid crystal display apparatus according to the at least one embodiment of the present invention can be suitably used for applications that require high quality display, such as a television receiver.

This application is based on Japanese Patent Application No. 2022-200263 filed on Dec. 15, 2022, the entire contents of which are hereby incorporated by reference.

What is claimed is:

1. A liquid crystal display apparatus, comprising:
a first substrate and a second substrate which are opposite each other;
a liquid crystal layer of a vertical alignment type, which is provided between the first substrate and the second substrate; and
a plurality of pixels arrayed in a matrix pattern including a plurality of rows and a plurality of columns,
wherein the first substrate includes:
  a pixel electrode provided in each of the plurality of pixels, and
  a first alignment film provided between the pixel electrode and the liquid crystal layer,
wherein the second substrate includes:
  a counter electrode provided opposite the pixel electrode, and
  a second alignment film provided between the counter electrode and the liquid crystal layer,
wherein each of the plurality of pixels includes a plurality of liquid crystal domains having reference alignment directions which are defined by the first alignment film and the second alignment film, and are different from each other,
wherein the plurality of liquid crystal domains includes:
  a first liquid crystal domain having a reference alignment direction which is a first direction,
  a second liquid crystal domain having a reference alignment direction which is a second direction,
  a third liquid crystal domain having a reference alignment direction which is a third direction, and
  a fourth liquid crystal domain having a reference alignment direction which is a fourth direction,
wherein the first direction, the second direction, the third direction, and the fourth direction are four directions in which a difference between any two directions is substantially equal to an integral multiple of 90°,
wherein each of the plurality of pixels has a shape in which a longitudinal direction and a transverse direction are defined,
wherein the first liquid crystal domain, the second liquid crystal domain, the third liquid crystal domain, and the fourth liquid crystal domain are arranged in two rows and two columns,
wherein the first liquid crystal domain and the second liquid crystal domain are adjacent to each other along the transverse direction,
wherein the third liquid crystal domain and the fourth liquid crystal domain are adjacent to each other along the transverse direction,
wherein the first liquid crystal domain and the fourth liquid crystal domain are adjacent to each other along the longitudinal direction,
wherein the second liquid crystal domain and the third liquid crystal domain are adjacent to each other along the longitudinal direction,
wherein a portion provided close to the first liquid crystal domain among a plurality of edges of the pixel electrode includes a first longitudinal edge portion extending along the longitudinal direction, and a direction which is orthogonal to the first longitudinal edge portion and is directed toward an inner side of the pixel electrode forms an angle less than 90° with respect to the first direction,
wherein a portion provided close to the second liquid crystal domain among the plurality of edges of the pixel electrode includes a second longitudinal edge portion extending along the longitudinal direction, and a direction which is orthogonal to the second longitudinal edge portion and is directed toward the inner side of the pixel electrode forms an angle exceeding 90° with respect to the second direction,
wherein a portion provided close to the third liquid crystal domain among the plurality of edges of the pixel electrode includes a third longitudinal edge portion extending along the longitudinal direction, and a direction which is orthogonal to the third longitudinal edge portion and is directed toward the inner side of the pixel electrode forms an angle less than 90° with respect to the third direction,
wherein a portion provided close to the fourth liquid crystal domain among the plurality of edges of the pixel electrode includes a fourth longitudinal edge portion extending along the longitudinal direction, and a direction which is orthogonal to the fourth longitudinal edge portion and is directed toward the inner side of the pixel electrode forms an angle exceeding 90° with respect to the fourth direction,
wherein the pixel electrode includes:
  a plurality of first slits which is formed in a region corresponding to the first liquid crystal domain, and extends in a fifth direction,
  a plurality of second slits which is formed in a region corresponding to the second liquid crystal domain, and extends in a sixth direction,
  a plurality of third slits which is formed in a region corresponding to the third liquid crystal domain, and extends in a seventh direction, and
  a plurality of fourth slits which is formed in a region corresponding to the fourth liquid crystal domain, and extends in an eighth direction,
wherein an acute angle $\theta_5$ formed by the fifth direction with respect to the longitudinal direction is smaller than an acute angle $\theta_1$ formed by the first direction with respect to the longitudinal direction,
wherein an acute angle $\theta_6$ formed by the sixth direction with respect to the longitudinal direction is equal to or smaller than an acute angle $\theta_2$ formed by the second direction with respect to the longitudinal direction, wherein an acute angle $\theta_7$ formed by the seventh direction with respect to the longitudinal direction is smaller than an acute angle $\theta_3$ formed by the third direction with respect to the longitudinal direction, wherein an acute angle $\theta_8$ formed by the eighth direction with respect to the longitudinal direction is equal to or smaller than an acute angle $\theta_4$ formed by the fourth direction with respect to the longitudinal direction, wherein each of a difference between the acute angle $\theta_5$ and the acute angle $\theta_1$ and a difference between the acute angle $\theta_7$ and the acute angle $\theta_3$ is larger than each of a difference between the acute angle $\theta_6$ and the acute angle $\theta_2$ and a difference between the acute angle $\theta_8$ and the acute angle $\theta_4$, and wherein the liquid crystal display apparatus reduces a total area of dark lines so as to improve a transmittance of the liquid crystal display apparatus.

2. The liquid crystal display apparatus according to claim 1, wherein each of the acute angle $\theta_1$, the acute angle $\theta_2$, the acute angle $\theta_3$, and the acute angle $\theta_4$ is substantially 45°.

3. The liquid crystal display apparatus according to claim 1,
wherein the plurality of first slits is formed in a substantially entire region corresponding to the first liquid crystal domain,
wherein the plurality of second slits is formed in a substantially entire region corresponding to the second liquid crystal domain,
wherein the plurality of third slits is formed in a substantially entire region corresponding to the third liquid crystal domain, and
wherein the plurality of fourth slits is formed in a substantially entire region corresponding to the fourth liquid crystal domain.

4. The liquid crystal display apparatus according to claim 1, wherein each of the difference between the acute angle $\theta_5$ and the acute angle $\theta_1$ and the difference between the acute angle $\theta_7$ and the acute angle $\theta_3$ is 7.5° or more and 12.5° or less.

5. The liquid crystal display apparatus according to claim 1, wherein each of the difference between the acute angle $\theta_6$ and the acute angle $\theta_2$ and the difference between the acute angle $\theta_8$ and the acute angle $\theta_4$ is 0° or more and 5.0° or less.

6. The liquid crystal display apparatus according to claim 1,
wherein the pixel electrode further includes:
a first connection slit which is formed in the region corresponding to the first liquid crystal domain, and connects end portions on a second liquid crystal domain side of two or more first slits among the plurality of first slits to each other; and
a second connection slit which is formed in the region corresponding to the third liquid crystal domain, and connects end portions on a fourth liquid crystal domain side of two or more third slits among the plurality of third slits to each other.

7. The liquid crystal display apparatus according to claim 6, wherein the pixel electrode further includes:
a third connection slit which is formed in the region corresponding to the second liquid crystal domain, and connects end portions on a third liquid crystal domain side of two or more second slits among the plurality of second slits to each other; and
a fourth connection slit which is formed in the region corresponding to the fourth liquid crystal domain, and connects end portions on a first liquid crystal domain side of two or more fourth slits among the plurality of fourth slits to each other.

8. A liquid crystal display, comprising:
a first substrate and a second substrate which are opposite each other;
a liquid crystal layer of a vertical alignment type, which is provided between the first substrate and the second substrate; and
a plurality of pixels arrayed in a matrix pattern including a plurality of rows and a plurality of columns,
wherein the first substrate includes:
a pixel electrode provided in each of the plurality of pixels, and
a first alignment film provided between the pixel electrode and the liquid crystal layer,
wherein the second substrate includes:
a counter electrode provided opposite the pixel electrode, and
a second alignment film provided between the counter electrode and the liquid crystal layer,
wherein each of the plurality of pixels includes a plurality of liquid crystal domains having reference alignment directions which are defined by the first alignment film and the second alignment film, and are different from each other,
wherein the plurality of liquid crystal domains includes:
a first liquid crystal domain having a reference alignment direction which is a first direction,
a second liquid crystal domain having a reference alignment direction which is a second direction,
a third liquid crystal domain having a reference alignment direction which is a third direction, and
a fourth liquid crystal domain having a reference alignment direction which is a fourth direction,
wherein the first direction, the second direction, the third direction, and the fourth direction are four directions in which a difference between any two directions is substantially equal to an integral multiple of 90°,
wherein each of the plurality of pixels has a shape in which a longitudinal direction and a transverse direction are defined,
wherein the first liquid crystal domain, the second liquid crystal domain, the third liquid crystal domain, and the fourth liquid crystal domain are arranged in two rows and two columns,
wherein the first liquid crystal domain and the second liquid crystal domain are adjacent to each other along the transverse direction,
wherein the third liquid crystal domain and the fourth liquid crystal domain are adjacent to each other along the transverse direction,
wherein the first liquid crystal domain and the fourth liquid crystal domain are adjacent to each other along the longitudinal direction,
wherein the second liquid crystal domain and the third liquid crystal domain are adjacent to each other along the longitudinal direction,
wherein a portion provided close to the first liquid crystal domain among a plurality of edges of the pixel electrode includes a first longitudinal edge portion extending along the longitudinal direction, and a direction which is orthogonal to the first longitudinal edge portion and is directed toward an inner side of the pixel electrode forms an angle less than 90° with respect to the first direction, wherein a portion provided close to the second liquid crystal domain among the plurality of edges of the pixel electrode includes a second longitudinal edge portion extending along the longitudinal direction, and a direction which is orthogonal to the second longitudinal edge portion and is directed toward the inner side of the pixel electrode forms an angle exceeding 90° with respect to the second direction, wherein a portion provided close to the third liquid crystal domain among the plurality of edges of the pixel electrode includes a third longitudinal edge portion extending along the longitudinal direction, and a direction which is orthogonal to the third longitudinal edge portion and is directed toward the inner side of the pixel electrode forms an angle less than 90° with respect to the third direction, wherein a portion provided close to the fourth liquid crystal domain among the plurality of edges of the pixel electrode includes a fourth longitudinal edge portion extending along the longitudinal direction, and a direction which is orthogonal to the fourth longitudinal edge portion and is directed toward the inner side of the pixel electrode forms an angle exceeding 90° with respect to the fourth direction, wherein the pixel electrode includes:
 a plurality of first slits which is formed in a region corresponding to the first liquid crystal domain, and extends in a fifth direction,
 a plurality of second slits which is formed in a region corresponding to the second liquid crystal domain, and extends in a sixth direction,
 a plurality of third slits which is formed in a region corresponding to the third liquid crystal domain, and extends in a seventh direction, and
 a plurality of fourth slits which is formed in a region corresponding to the fourth liquid crystal domain, and extends in an eighth direction, wherein an acute angle $\theta_5$ formed by the fifth direction with respect to the longitudinal direction is smaller than an acute angle $\theta_1$ formed by the first direction with respect to the longitudinal direction, wherein an acute angle $\theta_6$ formed by the sixth direction with respect to the longitudinal direction is equal to or smaller than an acute angle $\theta_2$ formed by the second direction with respect to the longitudinal direction, wherein an acute angle $\theta_7$ formed by the seventh direction with respect to the longitudinal direction is smaller than an acute angle $\theta_3$ formed by the third direction with respect to the longitudinal direction, wherein an acute angle $\theta_8$ formed by the eighth direction with respect to the longitudinal direction is equal to or smaller than an acute angle $\theta_4$ formed by the fourth direction with respect to the longitudinal direction, wherein each of a difference between the acute angle $\theta_5$ and the acute angle $\theta_1$ and a difference between the acute angle $\theta_7$ and the acute angle $\theta_3$ is larger than each of a difference between the acute angle $\theta_6$ and the acute angle $\theta_2$ and a difference between the acute angle $\theta_8$ and the acute angle $\theta_4$, wherein the plurality of first slits includes two or more first slits each having:
 a first part extending in the fifth direction,
 a second part which is positioned between the first part and the second liquid crystal domain, and extends in a ninth direction, and
 a third part which is positioned on an opposite side of the second part with respect to the first part, and extends in a tenth direction, wherein the plurality of third slits includes two or more third slits each having:
 a fourth part extending in the seventh direction,
 a fifth part which is positioned between the fourth part and the fourth liquid crystal domain, and extends in an eleventh direction, and
 a sixth part which is positioned on an opposite side of the fifth part with respect to the fourth part, and extends in a twelfth direction, wherein an acute angle $\theta_9$ formed by the ninth direction with respect to the longitudinal direction is smaller than the acute angle $\theta_5$ formed by the fifth direction with respect to the longitudinal direction, wherein an acute angle $\theta_{10}$ formed by the tenth direction with respect to the longitudinal direction is larger than the acute angle $\theta_5$ formed by the fifth direction with respect to the longitudinal direction, wherein an acute angle $\theta_{11}$ formed by the eleventh direction with respect to the longitudinal direction is smaller than the acute angle $\theta_7$ formed by the seventh direction with respect to the longitudinal direction, and wherein an acute angle $\theta_{12}$ formed by the twelfth direction with respect to the longitudinal direction is larger than the acute angle $\theta_7$ formed by the seventh direction with respect to the longitudinal direction.

9. The liquid crystal display apparatus according to claim 8,
wherein, when, in the region corresponding to the first liquid crystal domain of the pixel electrode, a region in which the first part is formed, a region in which the second part is formed, and a region in which the third part is formed are defined as a first region, a second region, and a third region, respectively,
a ratio La/Sa of a gap La between two first slits adjacent to each other among the plurality of first slits with respect to a width Sa of each of the plurality of first slits is smaller in the second region than in the first region, and is larger in the third region than in the first region, and
wherein, when, in the region corresponding to the third liquid crystal domain of the pixel electrode, a region in which the fourth part is formed, a region in which the fifth part is formed, and a region in which the sixth part is formed are defined as a fourth region, a fifth region, and a sixth region, respectively,
a ratio Lb/Sb of a gap Lb between two third slits adjacent to each other among the plurality of third slits with respect to a width Sb of each of the plurality of third slits is smaller in the fifth region than in the fourth region, and is larger in the sixth region than in the fourth region.

* * * * *